(12) United States Patent
Kirino et al.

(10) Patent No.: US 8,779,995 B2
(45) Date of Patent: Jul. 15, 2014

(54) HIGH-FREQUENCY WAVEGUIDE AND PHASE SHIFTER USING SAME, RADIATOR, ELECTRONIC DEVICE WHICH USES THIS PHASE SHIFTER AND RADIATOR, ANTENNA DEVICE, AND ELECTRONIC DEVICE EQUIPPED WITH SAME

(75) Inventors: Hideki Kirino, Tokyo (JP); Isao Yamamoto, Ehime (JP); Masashi Watanabe, Ehime (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 13/122,270

(22) PCT Filed: Oct. 1, 2009

(86) PCT No.: PCT/JP2009/005087
§ 371 (c)(1),
(2), (4) Date: Apr. 1, 2011

(87) PCT Pub. No.: WO2010/050122
PCT Pub. Date: May 6, 2010

(65) Prior Publication Data
US 2011/0187614 A1 Aug. 4, 2011

(30) Foreign Application Priority Data

Oct. 29, 2008 (JP) ................ 2008-277969
Oct. 29, 2008 (JP) ................ 2008-277970
Apr. 14, 2009 (JP) ................ 2009-097845

(51) Int. Cl.
| | | |
|---|---|---|
| *H01Q 1/32* | (2006.01) |
| *H01Q 13/10* | (2006.01) |
| *H01P 3/123* | (2006.01) |
| *H01Q 21/00* | (2006.01) |
| *G01S 7/03* | (2006.01) |
| *H01P 1/18* | (2006.01) |
| *H01Q 21/06* | (2006.01) |
| *H01Q 3/32* | (2006.01) |
| *G01S 13/93* | (2006.01) |

(52) U.S. Cl.
CPC .............. *H01P 1/182* (2013.01); *H01Q 1/3291* (2013.01); *H01Q 13/10* (2013.01); *H01P 3/123* (2013.01); *H01Q 21/0006* (2013.01); *G01S 2013/9375* (2013.01); *G01S 7/032* (2013.01); *H01Q 21/061* (2013.01); *H01Q 1/3233* (2013.01); *H01Q 3/32* (2013.01)
USPC .......................... 343/713; 343/701; 343/702

(58) Field of Classification Search
USPC ......................... 343/711, 713, 762, 767–786
See application file for complete search history.

(56) References Cited

U.S. PATENT DOCUMENTS

| | | |
|---|---|---|
| 2,711,517 A | 6/1955 | Krutter et al. |
| 3,108,237 A | 10/1963 | Reuvers et al. |
| 3,118,118 A | 1/1964 | Watts, Jr. |
| 4,533,887 A | 8/1985 | Morz et al. |
| 5,874,922 A | 2/1999 | Tanaka |
| 5,990,768 A * | 11/1999 | Takahashi et al. ............ 333/247 |
| 6,133,887 A | 10/2000 | Tanizaki et al. |
| 6,218,916 B1 | 4/2001 | Ishikawa et al. |
| 6,362,696 B1 | 3/2002 | Ishikawa et al. |
| 6,597,322 B2 | 7/2003 | Takenoshita |
| 6,995,637 B2 | 2/2006 | Tamura et al. |
| 7,142,165 B2 | 11/2006 | Sanchez et al. |
| 2002/0101386 A1 | 8/2002 | Takenoshita |
| 2004/0041663 A1* | 3/2004 | Uchimura et al. ............ 333/135 |
| 2004/0104793 A1 | 6/2004 | Tamura et al. |
| 2005/0128028 A1 | 6/2005 | Sanchez et al. |
| 2005/0219137 A1* | 10/2005 | Heisen et al. ................. 343/776 |
| 2006/0267852 A1* | 11/2006 | Ahn et al. ............... 343/781 CA |

FOREIGN PATENT DOCUMENTS

| | | |
|---|---|---|
| CA | 2 276 879 A1 | 1/2000 |
| CA | 2 276 879 C | 1/2000 |
| CN | 1128906 | 8/1996 |
| CN | 1505203 | 6/2004 |
| EP | 0 969 548 A2 | 1/2000 |
| EP | 0 969 548 A3 | 1/2000 |
| EP | 0 969 548 B1 | 1/2000 |
| EP | 1 331 688 | 7/2003 |

(56) References Cited

FOREIGN PATENT DOCUMENTS

| | | |
|---|---|---|
| GB | 785856 | 11/1957 |
| JP | 63-78601 | 4/1988 |
| JP | 2-156707 | 6/1990 |
| JP | 4-65902 | 3/1992 |
| JP | 11-351909 | 12/1999 |
| JP | 2000-22423 | 1/2000 |
| JP | 2001-274608 | 10/2001 |
| JP | 2002-185221 | 6/2002 |
| JP | 2002-223113 | 8/2002 |
| JP | 2003-202369 | 7/2003 |
| JP | 2003-304106 | 10/2003 |
| JP | 2004-48486 | 2/2004 |
| WO | 2008/081807 | 7/2008 |

OTHER PUBLICATIONS

International Search Report issued Jan. 19, 2010 in International (PCT) Application No. PCT/JP2009/005087.

Chinese Office Action issued Apr. 1, 2013 in corresponding Chinese Application No. 200980136408.9.

Supplementary European Search Report issued Oct. 24, 2013 in corresponding European Application No. 09823237.4.

\* cited by examiner

*Primary Examiner* — Michael G Lee
*Assistant Examiner* — Matthew Mikels
(74) *Attorney, Agent, or Firm* — Wenderoth, Lind & Ponack, L.L.P.

(57) ABSTRACT

This high-frequency waveguide is formed by first and second conductors disposed opposite each other at a spacing of $\lambda_0/2$, where $\lambda_0$ is the free space wavelength of the operating frequency of a high-frequency signal. A ridge is provided at the waveguide formation portion between these first and second conductors, which protrudes from one of the first and second conductors toward the other and is formed extending along the waveguide formation portion. A plurality of columnar protrusions with a height of $\lambda_0/4$ are disposed at a spacing of less than $\lambda_0/2$ to at least one of the first and second conductors on the outside of the waveguide formation portion and to the outside of the ridge.

10 Claims, 28 Drawing Sheets

HIGH-FREQUENCY WAVEGUIDE AND PHASE SHIFTER USING SAME, RADIATOR, ELECTRONIC DEVICE WHICH USES THIS PHASE SHIFTER AND RADIATOR, ANTENNA DEVICE, AND ELECTRONIC DEVICE EQUIPPED WITH SAME

TECHNICAL FIELD

The present invention relates to a high-frequency waveguide and a phase shifter in which this is used, to a radiator, to an electronic device in which this phase shifter and radiator are used, and to an antenna device and an electronic device equipped with this.

BACKGROUND ART

A high-frequency waveguide used as a transmission path for high-frequency energy is constituted by combining first and second waveguide constituting bodies.

More specifically, first and second waveguide constituting bodies each provided with a groove are integrated in a state in which the openings of the grooves are aligned, which constitutes a high-frequency waveguide. A prior publication that is similar to this is Patent Literature 1 (Japanese Laid-Open Patent Application 2004-48486).

CITATION LIST

Patent Literature

Patent Literature 1: Japanese Laid-Open Patent Application 2004-48486
Patent Literature 2: Japanese Laid-Open Patent Application 2002-223113

SUMMARY

The problem with the above prior art was that high-frequency energy leaked from the high-frequency waveguide. Specifically, the above-mentioned first and second waveguide constituting bodies are such that flanges provided around the outside of their grooves are integrated by welding or fastened with screws. If a gap should be formed in this process during a work error, then high-frequency energy will end up leaking from that portion.

In view of this, it is an object of the present invention to suppress leakage of high-frequency energy from a high-frequency waveguide.

In order to achieve the stated object, the present invention employs a structure having a ridge in the middle of what is known as a waffle iron structure, equipped with first and second conductors and columnar protrusions. The first and second conductors are disposed facing each other at a spacing of less than $\lambda_0/2$, where the free space wavelength of the operating frequency of a high-frequency signal is $\lambda_0$. The ridge protrudes from one of the first and second conductors toward the other in a waveguide formation portion formed between the first and second conductors, and is formed extending along the waveguide formation portion. A plurality of the columnar protrusions have a height of $\lambda_0/4$ and are disposed at a spacing of less than $\lambda_0/2$, on at least one of the first and second conductors on the outside of the waveguide formation portion and to the outside of the ridge.

Specifically, with the present invention, a ridge is provided that protrudes from one of the first and second conductors toward the other in a waveguide formation portion formed between the first and second conductors, and is formed extending along the waveguide formation portion. Consequently, an electric field is concentrated between this ridge and the conductors facing it, and high-frequency energy moves in a direction perpendicular to this electric field, that is, in the lengthwise direction of the ridge. As a result, leakage of high-frequency energy outside the waveguide formation portion is much less likely to occur.

Also, with the present invention, a plurality of columnar protrusions with a height of $\lambda_0/4$ are disposed at a spacing of less than $\lambda_0/2$ on at least one of the first and second conductors on the outside of the waveguide formation portion and to the outside of the ridge. Consequently, since a plurality of columnar protrusions are provided as mentioned above to the waveguide formation portion to the outside of this ridge, even if high-frequency energy should move to the outside of the ridge, movement of the high-frequency energy to the outside of the waveguide formation portion can be prevented. As a result, leakage of high-frequency energy can be effectively prevented.

Radar devices have come to be installed in automobiles in recent years for the purpose of collision avoidance, lane distance control, and so forth. These radar devices can take measurements even when the automobile is going around a curve, so a detection angle of about 15 degrees to the left and right (a total of 30 degrees) is needed.

One way to obtain this detection angle has been to use a configuration in which an antenna body is disposed in front of a transceiver via a waveguide body, and the antenna body is made movable to the left and right with respect to the waveguide body.

A prior publication that is similar to this is Patent Literature 2 (Japanese Laid-Open Patent Application 2002-223113).

Also, a problem with the above-mentioned prior art was that the antenna apparatus ended up being bulky. Specifically, to obtain the above-mentioned large detection angle of about 15 degrees to the left and right with an antenna apparatus, the antenna body must be extremely large. An antenna apparatus including a configuration in which such a large antenna body is driven to the left and right ends up being quite bulky when its movable space is included.

Today's automobiles have become more compact through efforts at energy conservation and so forth. Because of this trend, it is undesirable for an antenna apparatus to be too large even though it is used for safety. That is, there is a need for the antenna apparatus itself to be made smaller.

In view of this, it is an object of the present invention to reduce the size of an antenna apparatus, and to simplify the configuration.

To achieve the stated object, the present invention comprises an antenna body, a stationary waveguide body, a movable waveguide body, and a transceiver. The antenna body has first and second radiation element groups having radiation element rows including a plurality of radiation elements disposed at a specific spacing. The movable waveguide body forms a waveguide body between itself and the stationary waveguide body, and moves relatively with respect to the stationary waveguide body. The transceiver is provided to the rear of the antenna body, via the waveguide body. The plurality of waveguides provided to the movable waveguide body has a first waveguide, a second waveguide, and a third waveguide. The first waveguide is constituted by a plurality of waveguides corresponding to the first radiation element group. The second waveguide is constituted by a plurality of waveguides corresponding to the second radiation element group. The third waveguide is such that the phase difference in the first and second radiation element groups between the radiation element rows of the first radiation element group and the radiation element rows of the second radiation element group, which are adjacent to one another, is matched to be the same as the phase difference between the mutually adjacent other radiation element rows included in the first and second radiation element groups.

Specifically, with the present invention, the antenna body is a stationary type, and the waveguide body disposed to its rear is a movable type, which allows a wider detection angle to be obtained. Accordingly, the size is much smaller than when the antenna body itself is made movable within the apparatus.

Furthermore, with the present invention, the constitution of the above-mentioned first, second, and third waveguides shortens the distance between the first and second radiation element groups to be about the same as the distance between adjacent transmission and reception openings. Thus, this prevents the scattering of radio waves in unnecessary directions, which increases as the distance grows between the first and second radiation element groups.

DESCRIPTION OF EMBODIMENTS

An embodiment of the present invention will now be described, using an automobile as an example of an electronic device.

Embodiment 1

Figure 1:
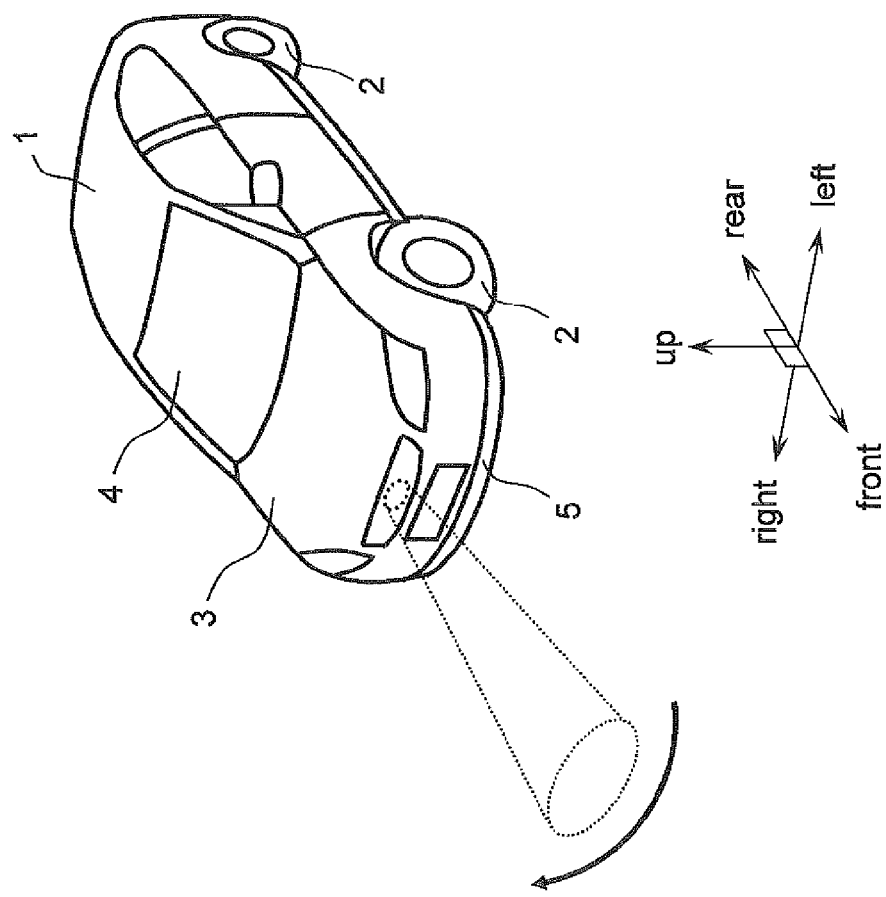
FIG. 1 is an oblique view of an automobile to which an embodiment of the present invention has been applied.

In FIG. 1, 1 is an automobile body, and four tires 2 are provided under this automobile body 1.

These tires 2 are rotationally driven by an engine (not shown) installed under a hood 3 of the automobile body 1.

A panel (not shown) for controlling the operation of the tires 2 is provided within the vehicle interior 4. The antenna apparatus 6 shown in FIG. 2 is provided above a bumper 5 on the front face side of the automobile body 1.

Figure 2:
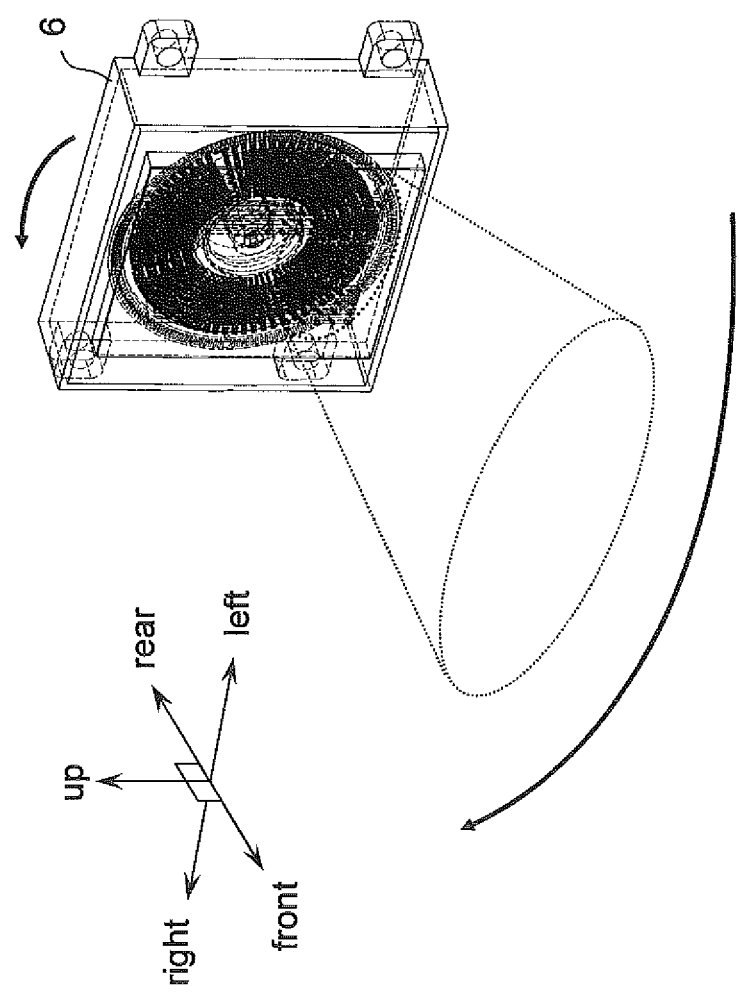
FIG. 2 is an oblique view of the antenna apparatus pertaining to an embodiment of the present invention.

This antenna apparatus 6 will be described in detail below, but as shown in FIGS. 1 and 2 here, radio waves of 76.5 GHz are emitted from the front face side of the automobile body 1, over left and right ranges (such as 15 degrees, or a total of 30 degrees) horizontally from the center with respect to the forward range (such as 150 meters), while the angle thereof is successively scanned back and forth. The antenna apparatus 6 receives reflected waves from up to 150 meters ahead at the angle at which the waves were emitted, so that any objects (such as other automobiles, debris, or the like that is ahead) and so forth are detected within a range of 150 meters ahead, and this information is used for various controls over the automobile body 1.

These various controls include, for example, control in which the distance to another automobile that is ahead is measured, so that the speed of the host vehicle is controlled in an attempt to maintain the distance to the automobile that is ahead. Alternatively, this can be control in which debris is detected in the road ahead, and a warning is given in the interior 4, for example.

Figure 3:
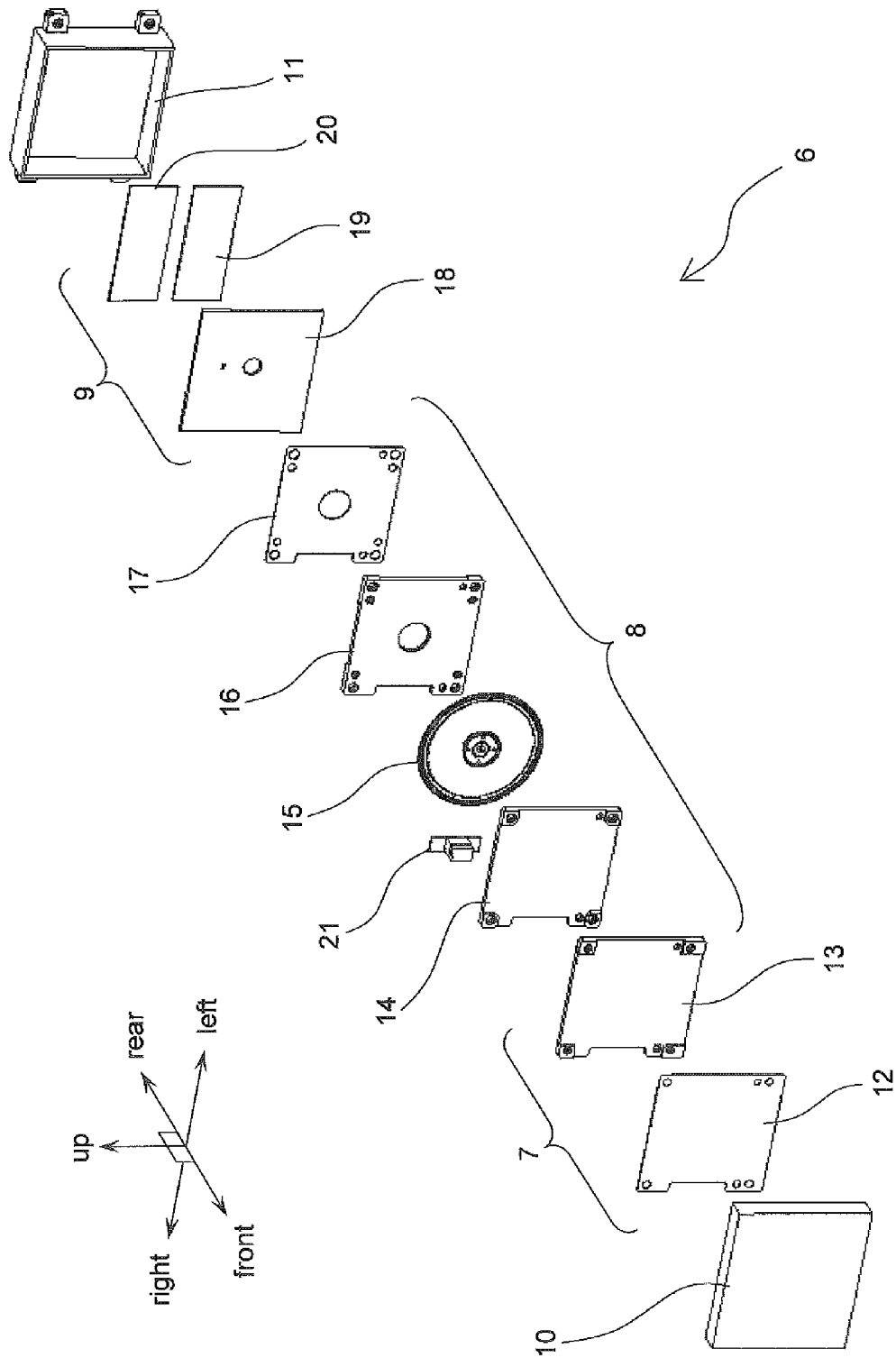
FIG. 3 is an exploded oblique view of the antenna apparatus pertaining to an embodiment of the present invention.

More specifically, the antenna apparatus 6 shown in FIG. 2 is constituted by various parts as shown in FIG. 3. The orientation of the parts in FIG. 3 corresponds to that in FIGS. 1 and 2.

In FIG. 3, 7 is an antenna body, and a transceiver 9 is disposed to the rear of this antenna body 7 via a waveguide body 8. Also, a cover (a radio wave-transmissible cover) 10 is disposed in front of the antenna body 7, and a case 11 is disposed to the rear of the transceiver 9.

As shown in FIG. 3, the antenna body 7 is made up of two plate-like members comprising a plate body 12 and a plate body 13. The waveguide body 8 is made up of five plate-like members comprising the plate body 13, a plate body 14, a plate body 15, a plate body 16, and a plate body 17. The transceiver 9 is made up of a substrate base 18, a controller 19, and an RF circuit board 20.

The reason that the plate body 13 is included in both the antenna body 7 and the waveguide body 8 is that the front side of the plate body 13 is used as the antenna body 7, while the rear side is used as the waveguide body 8.

Although not depicted in FIG. 3, the plate bodies 12, 13, 14, 15, 16, and 17 are each provided with columnar protrusions, ridges, and through-holes (for interlayer connection) as discussed below (see FIGS. 10 to 19).

Further, although not depicted in FIG. 3, in an assembled state, the plate bodies 12 and 13 of the antenna body 7, as well as the plate bodies 14, 15, 16, and 17 of the waveguide body 8 are maintained in a state of being separated at a specific spacing. In particular, the plate body 15 of the waveguide body 8 has a disk shape, and is configured such that the plate body 14 and the plate body 16 move rotationally with a specific spacing between them, around the center of the disk. Consequently, the desired detection angle can be ensured to the left and right merely by rotationally driving the disk-shaped plate body 15. Since there is no need for the antenna body to be made movable as in the past, the configuration can be simplified.

The phase shifter and the high-frequency waveguide are constituted inside the antenna body 7 and the waveguide body 8 so that even in a state in which the above-mentioned plate bodies 12 to 17 are separated by a specific gap, the high-frequency energy supplied from the transceiver 9 will not be scattered in the surroundings, but will be phase controlled and allocated by an antenna plate 12.

The structure of the high-frequency waveguide and phase shifter used in this embodiment will now be described, but first we will describe the basic operating principle thereof.

Figure 4:
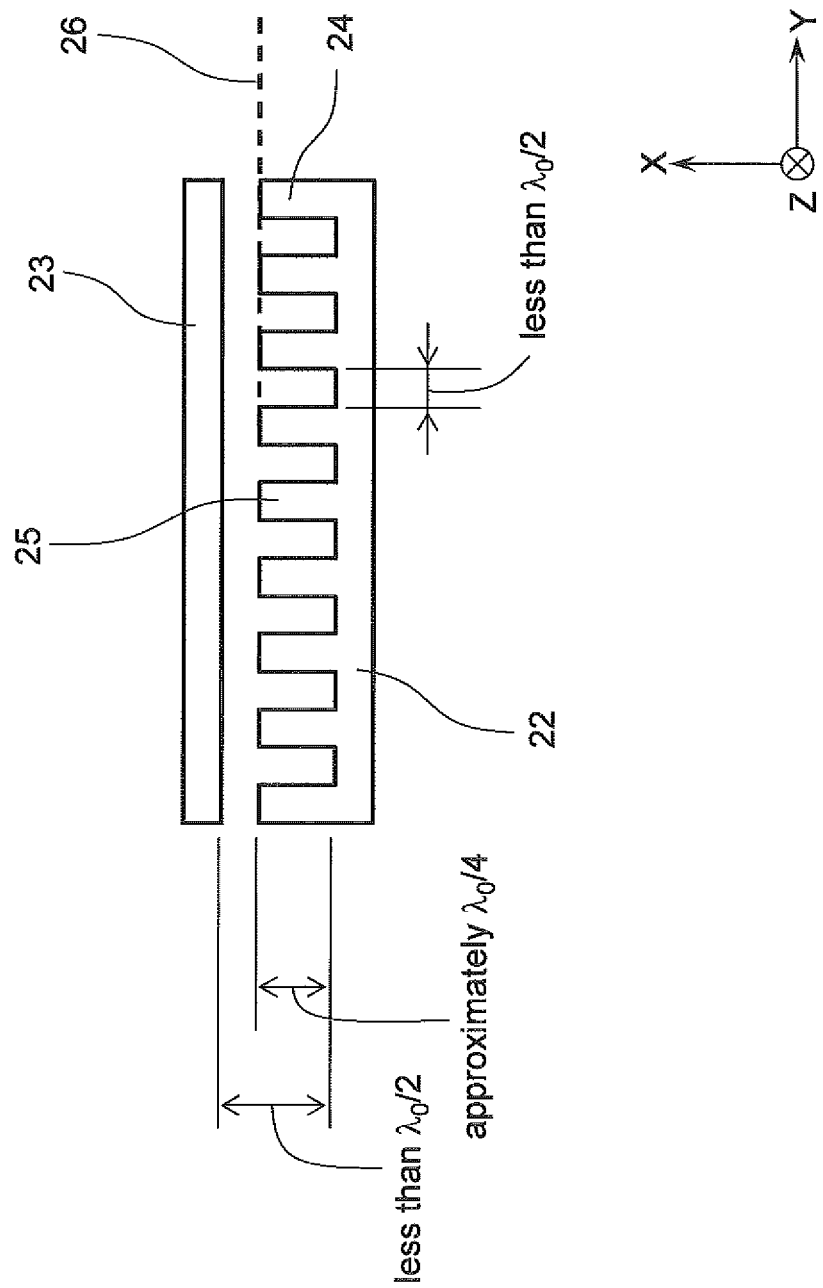
FIG. 4 is a cross section of a basic waveguide pertaining to an embodiment of the present invention.
Figure 5:
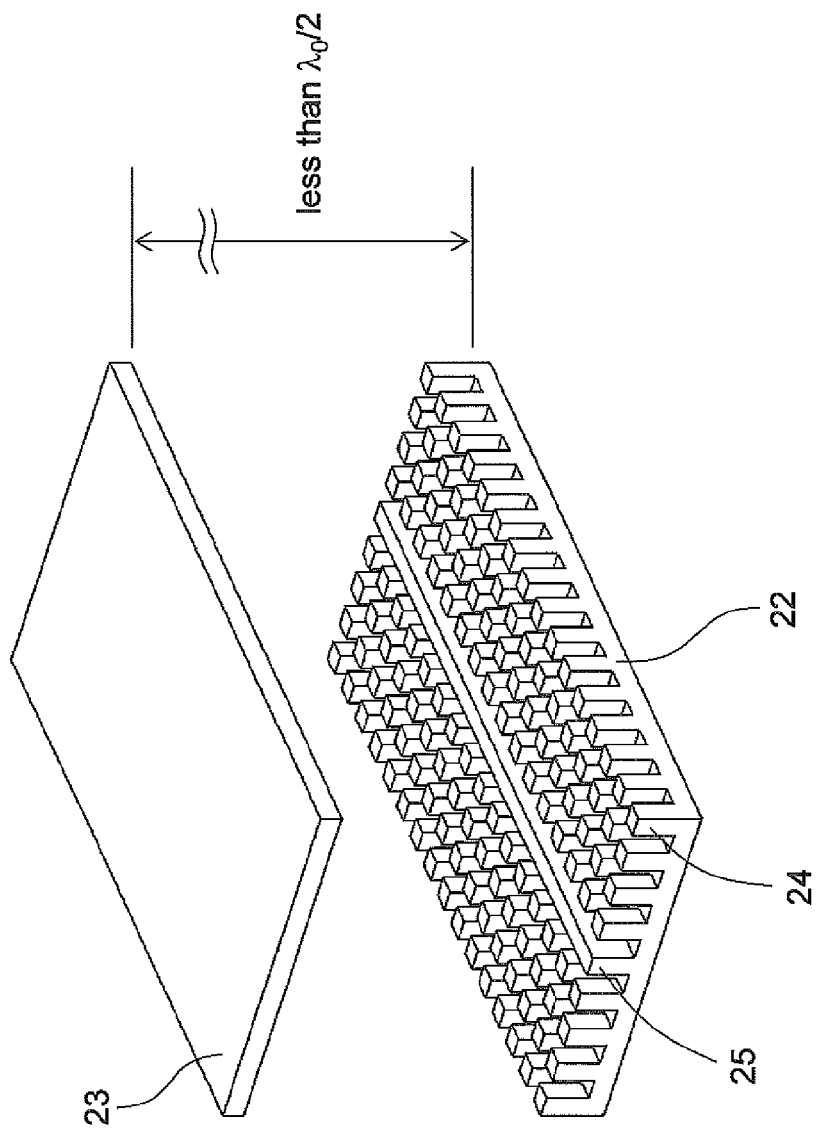
FIG. 5 is an oblique view of a basic waveguide pertaining to an embodiment of the present invention.

FIG. 4 is a cross section illustrating the basic operating principle of the high-frequency waveguide and the phase shifter, while FIG. 5 is an oblique view thereof.

As shown in FIGS. 4 and 5, the high-frequency waveguide in this embodiment is formed by two conductors disposed in parallel at a spacing of less than $\lambda_0/2$ (where $\lambda_0$ is the free space wavelength of the operating frequency of a high-frequency signal), that is, a lower conductor 22 (first conductor, second conductor) and an upper conductor 23 (second conductor, first conductor). Also, the high-frequency waveguide has a so-called waffle iron structure, in which columnar protrusions 24 (protrusions for preventing electromagnetic wave leakage) with a height of approximately $\lambda_0/4$ are disposed two-dimensionally on the surface of the lower conductor 22 (one of the conductors) at a spacing of $\lambda_0/2$ between each other. A ridge 25 formed continuously along the transmission path of high-frequency energy is provided on the inside of this waffle iron structure.

In other words, the ridge 25 is provided to a waveguide formation portion between the lower conductor 22 and the upper conductor 23. A plurality of the columnar protrusions 24 are provided on the outside of this ridge 25 and on the outside of the waveguide formation portion.

The high-frequency energy transmission characteristics of the structure shown in FIGS. 4 and 5 will now be described.

First, it is well known that the two conductors 22 and 23 disposed in parallel at a spacing of less than $\lambda_0/2$ operate as a parallel plate waveguide that transmits only a basic mode having only a perpendicular electric field to the conductors. Meanwhile, the gaps between the columnar protrusions 24 are equivalent to a transmission path whose distal ends have been short-circuited by the lower conductor 22. Accordingly, the region of the gaps between the columnar protrusions 24 in a plane 26 that connects the distal ends of the columnar protrusions 24 with a height of $\lambda_0/4$ as shown in FIG. 4 is equivalent to a magnetic wall with which an electric field cannot be present in a direction perpendicular to this plane. That is, the structure in FIGS. 4 and 5 is inherently a parallel plate waveguide that can transmit high-frequency energy (radio waves) resulting from an electric field perpendicular to the two conductors 22 and 23. However, since there is, aside from the waveguide formation portion to the outside of the ridge 25, a waffle iron structure in which the columnar protrusions 24 with a height of $\lambda_0/4$ are disposed two-dimensionally, a characteristic is that high-frequency energy cannot be transmitted.

The reason for specifying the gap between the columnar protrusions 24 to be less than $\lambda_0/2$ is to prevent a higher-order transmission mode from occurring in the gaps between the columnar protrusions 24, and reliably obtain the characteristic whereby high-frequency energy cannot be transmitted.

As shown in FIGS. 4 and 5, when the ridge 25 is provided continuous to the interior of the waffle iron structure, since the surface of the ridge 25 is an electrical wall, an electric field perpendicular to the surface of the ridge 25 can be a continuous path along the ridge 25, just as with a parallel plate waveguide. That is, a transmission path for high-frequency energy can be formed along the ridge 25.

Specifically, the structure shown in FIGS. 4 and 5 functions as a basic waveguide capable of efficiently transmitting high-frequency energy along the ridge, without scattering it to the surroundings.

Figure 28:
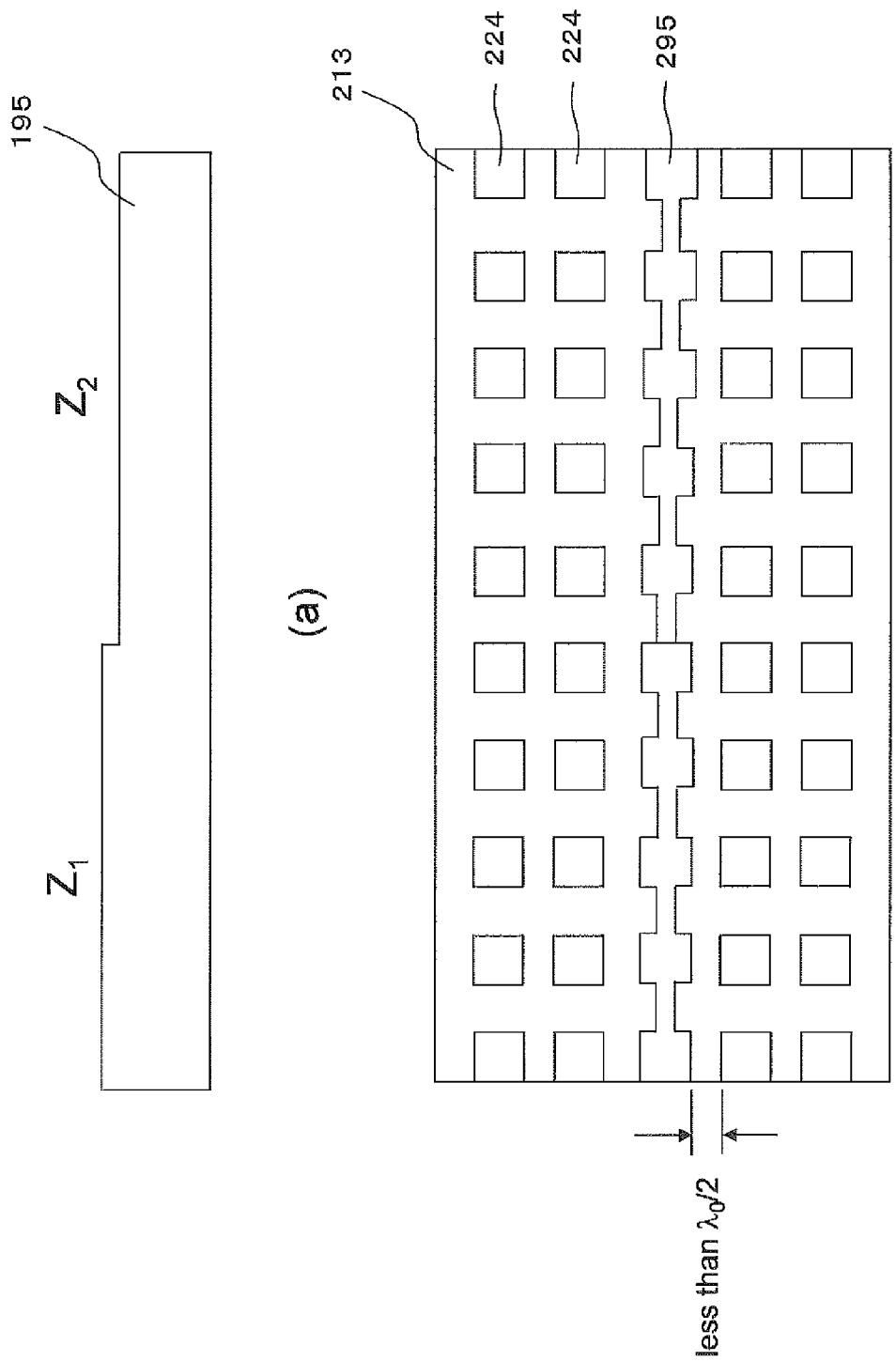
FIGS. 28a and 28b are a side cross section and a plan view of a plate body, illustrating a configuration in which the dimensions (height and width) in the lengthwise direction of the ridge pertaining to another embodiment of the present invention are varied.

With the above-mentioned high-frequency waveguide, the proportion of voltage and current in the transmitted high-frequency energy can be varied by varying the height in the lengthwise direction of the ridge 25 (see FIG. 23), or by varying the width in a direction perpendicular to the lengthwise direction (see FIG. 28). Thus, impedance paths of difference characteristics can be produced. That is, if the width is varied or the height is varied in the lengthwise direction of the ridge 25, the size of the capacity component (C) formed between the conductor 23 and the opposing ridge 25 can be varied. As a result, impedance paths of difference characteristics can be easily produced.

Figure 11:
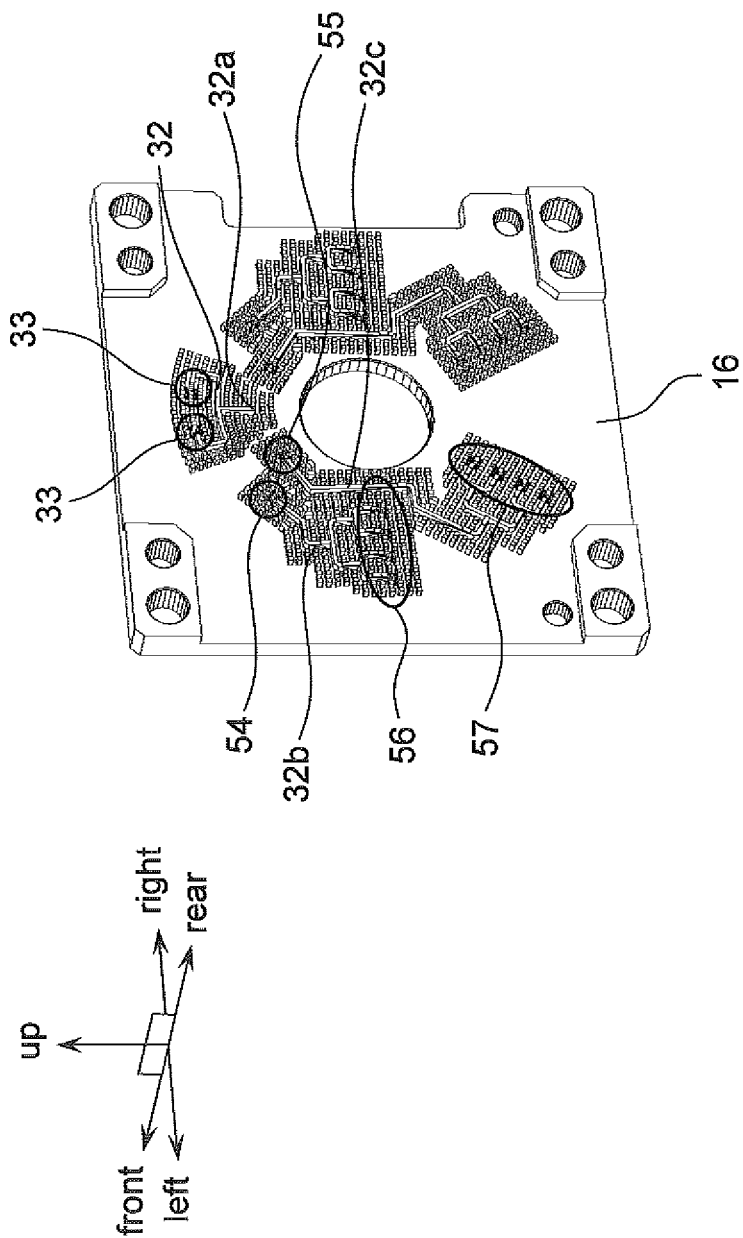
FIG. 11 is an oblique view of a fifth plate body as seen from the rear.

Furthermore, a branched line can also be easily produced by dividing the ridge 25 into a plurality of segments in its extension direction (more specifically, into a T shape) (see FIG. 11).

Furthermore, high-frequency energy will not be scattered into the surroundings even though the lower conductor 22 and the upper conductor 23 are not in contact. Consequently, coupling can be minimized even without providing any special shielding structure at the boundary between adjacent lines, so production is easier. In addition, since air is used with extremely little loss as the dielectric for the waveguide, this is particularly suitable for milliwave applications that require low loss.

That is, if the high-frequency waveguide of this embodiment is used in an antenna feeder circuit with numerous couplings or branches, such as a milliwave on-board radar, both production and assembly will be simple, with no worry about poor contact due to aging, and a low-loss antenna apparatus can be obtained.

Figure 6:
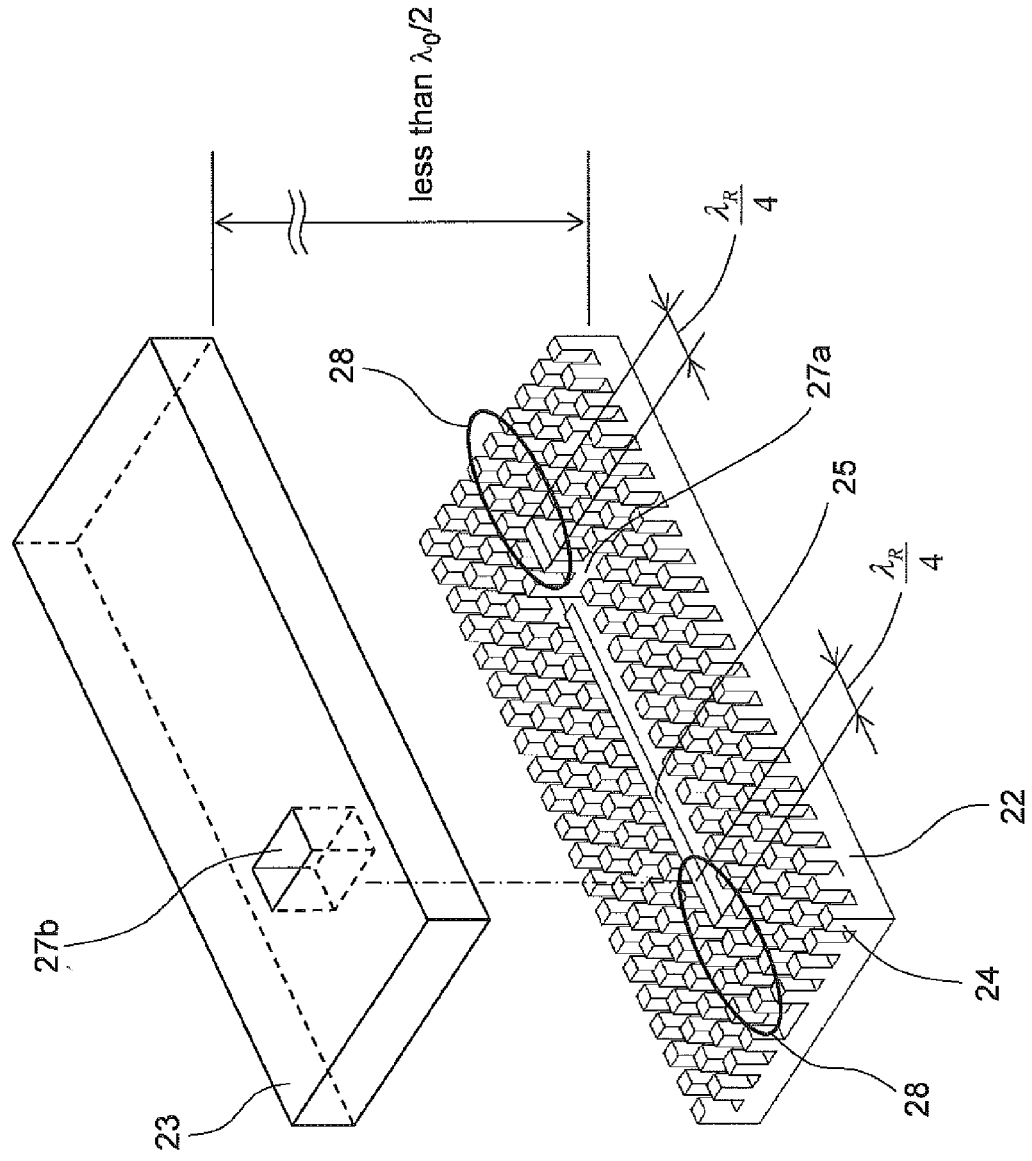
FIG. 6 is an oblique view of a waveguide having a through-hole pertaining to an embodiment of the present invention.

FIG. 6 shows a structure in which through-holes 27a and 27b are provided in a direction perpendicular to the waveguide formation portion in order to use the above-mentioned high-frequency waveguide in laminated form. In FIG. 6, 27a and 27b are through-holes through which the high-frequency energy leaves and enters the upper and lower layers, and 28 is a choke structure for efficiently transmitting high-frequency energy to the through-holes 27a and 27b as well as blocking the transmission of high-frequency energy in the direction in which the ridge 25 extends. This structure comprises a waveguide with an open distal end of $\lambda_R/4$ (where $\lambda_R$ is the wavelength of a radio wave that transmits the waveguide formation portion from the ends of the through-holes 27a and 27b, and a plurality of columnar protrusions 24 with a height of approximately $\lambda_0/4$ disposed on the outside of the waveguide in which said distal end is opened.

That is, with the choke structure 28, a position where there has been movement to a length of $\lambda_R/4$ of the waveguide with the opened distal end is equivalent with a short-circuited state. Accordingly, the waveguide wall of the through-hole 27 is short circuited with the ridge 25. Thus, high-frequency energy is efficiently transmitted from the ridge 25 to the through-hole 27. The columnar protrusions 24 with a height of $\lambda_0/4$ disposed on the outside of the waveguide with the opened distal end reduce leakage from the distal end of the waveguide, and are provided to achieve a more ideal open state.

Furthermore, with the above-mentioned high-frequency waveguide, as discussed above, the leakage of high-frequency energy can be prevented even though the lower conductor 22 and the upper conductor 23 are not touching each other. Here, the focus will be on this feature, and FIG. 7 shows a structure in which the shape of the through-hole to the upper layer on one side of the ridge 25 has been designed such that a waveguide is obtained even if the lower conductor 22 and the upper conductor 23 should slide relative to each other.

Figure 7:
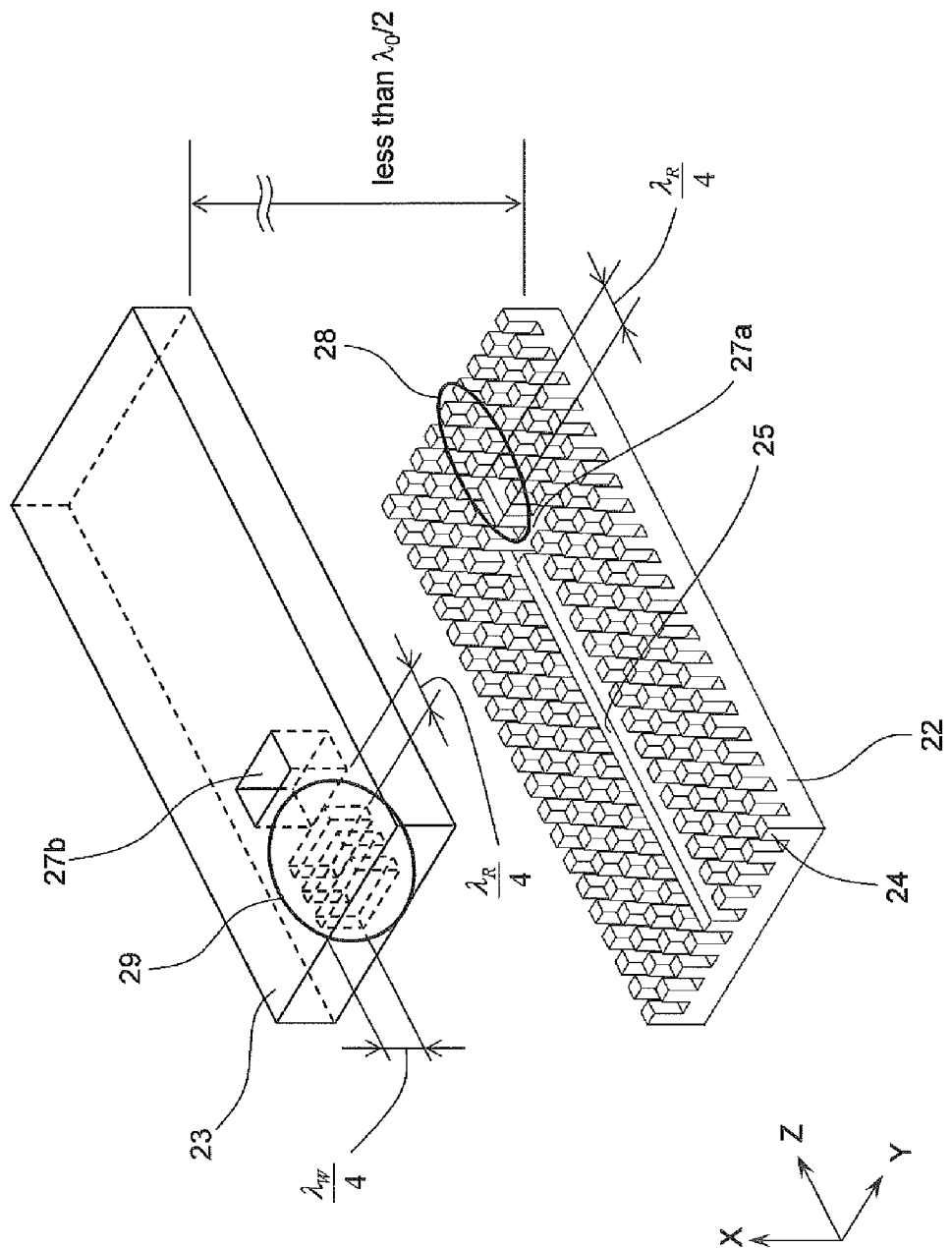
FIG. 7 is an oblique view of a phase shifter in an embodiment of the present invention.

In FIG. 7, 27a and 27b are through-holes through which the high-frequency energy leaves and enters the upper and lower layers, and 29 is a choke structure provided to the upper conductor 23 to efficiently transmit high-frequency energy to the through-hole 27b as well as blocking the transmission of high-frequency energy in the direction in which the ridge 25 extends. This choke structure 29 is such that a plurality of waveguide-shaped grooves, which have a depth of approximately $\lambda_W/4$ and which are short-circuited at the distal ends, are disposed, with the $\lambda_R/4$ position at the front, where $\lambda_R$ is the wavelength on the waveguide from the end of the through-hole 27b to the upper layer. $\lambda_W$ the in-guide wavelength of the groove at the waveguide formation portion.

In other words, with the choke structure 29, the entrance to waveguide-shaped grooves provided to the upper conductor 23, having a depth of approximately $\lambda_W/4$ and which are short-circuited at the distal ends, is equivalent to an open state. Accordingly, return current is blocked at the lower face of the upper conductor 23 that makes a pair with the current flowing over the ridge 25 at this position, and the impedance is open at this position. Thus, with the through-hole 27b provided at a position of $\lambda_R/4$ from this position, the ridge and the waveguide wall of the through-hole 27b is equivalent to a short circuit. As a result, high-frequency energy is efficiently transmitted from the ridge 25 to the through-hole 27b. The reason for disposing a plurality of waveguide-shaped grooves which have a depth of approximately $\lambda_W/4$ and which are short-circuited at the distal ends is to suppress the leakage of current that jumps out of the waveguide-shaped grooves, and achieve a more ideal open state.

In other words, with the structure shown in FIG. 7, when the lower conductor 22 and the upper conductor 23 are slid parallel to each other in the Z direction of the coordinate axes shown in the drawing, the distance varies between the two through-holes 27a and 27b of the lower conductor 22 and the upper conductor 23. Thus, it is possible for this structure to operate as a phase shifter that changes the phase of the high-frequency energy passing between the two through-holes 27a and 27b.

Specifically, with the phase shifter in this embodiment, the features of the high-frequency waveguide shown in FIG. 6 are retained. Consequently, the high-frequency energy is not scattered to the surroundings, and coupling between adjacent phase shifters can also be kept low. Furthermore, production and assembly will be simple, with no worry about poor contact due to aging. In particular, a low-loss phase shifter can be realized in the milliwave band of an onboard radar or the like.

Next, a specific example of a phase shifter will be described, corresponding to a description using the actual drawings discussed below.

Figure 8:
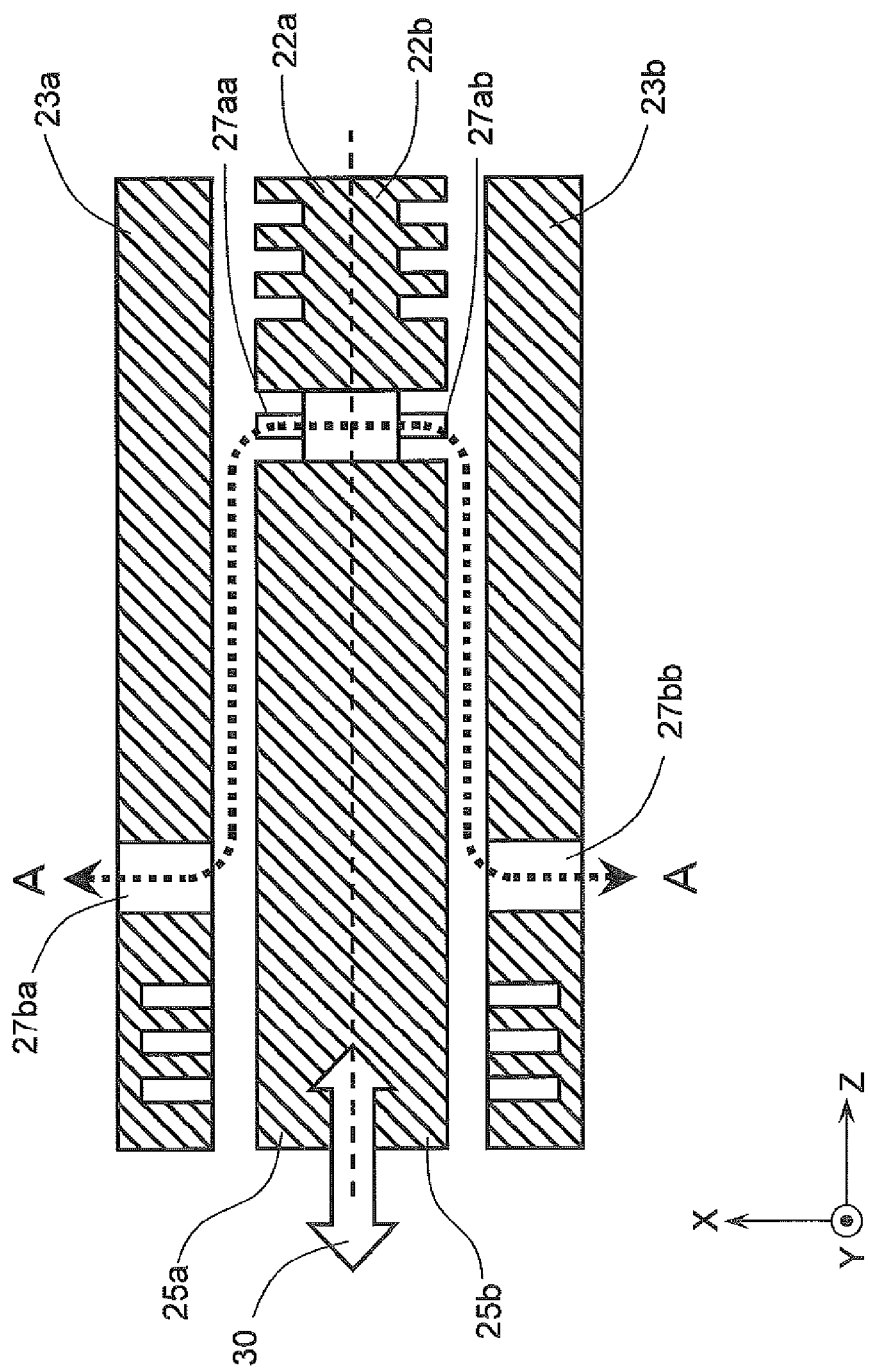
FIG. 8 is a cross section of a laminated type of variable phase shifter pertaining to an embodiment of the present invention.

FIG. 8 shows a cross section of a structure in which two of the phase shifters shown in FIG. 7 are used, and lower conductors 22a and 22b of the two phase shifters are laminated back to back, wherein this structure is cut along ridges 25a and 25b. With the structure shown in FIG. 8, the upper and lower conductors 23a and 23b are fixed to each other, and an intermediate conductor in which the conductors 22a and 22b are integrated is slid in the direction of the arrow 30 in the drawing. Consequently, the waveguide length between through-holes 27ba and 27bb (between A-A) varies via through-holes 27aa and 27ab (linking path). Thus, the structure operations as a variable phase shifter that varies the phase of high-frequency energy passing between A-A. That is, the phase shifter in FIG. 8 is distinguished from the phase shifter in FIG. 7 in that the positions of the two input/output terminals (the through-holes 27ba and 27bb) of the phase shifter indicated by A in FIG. 8 do not vary during operation of the phase shifter, and that the phase shift is twice the amount of relative sliding of the intermediate conductor.

Figure 9:
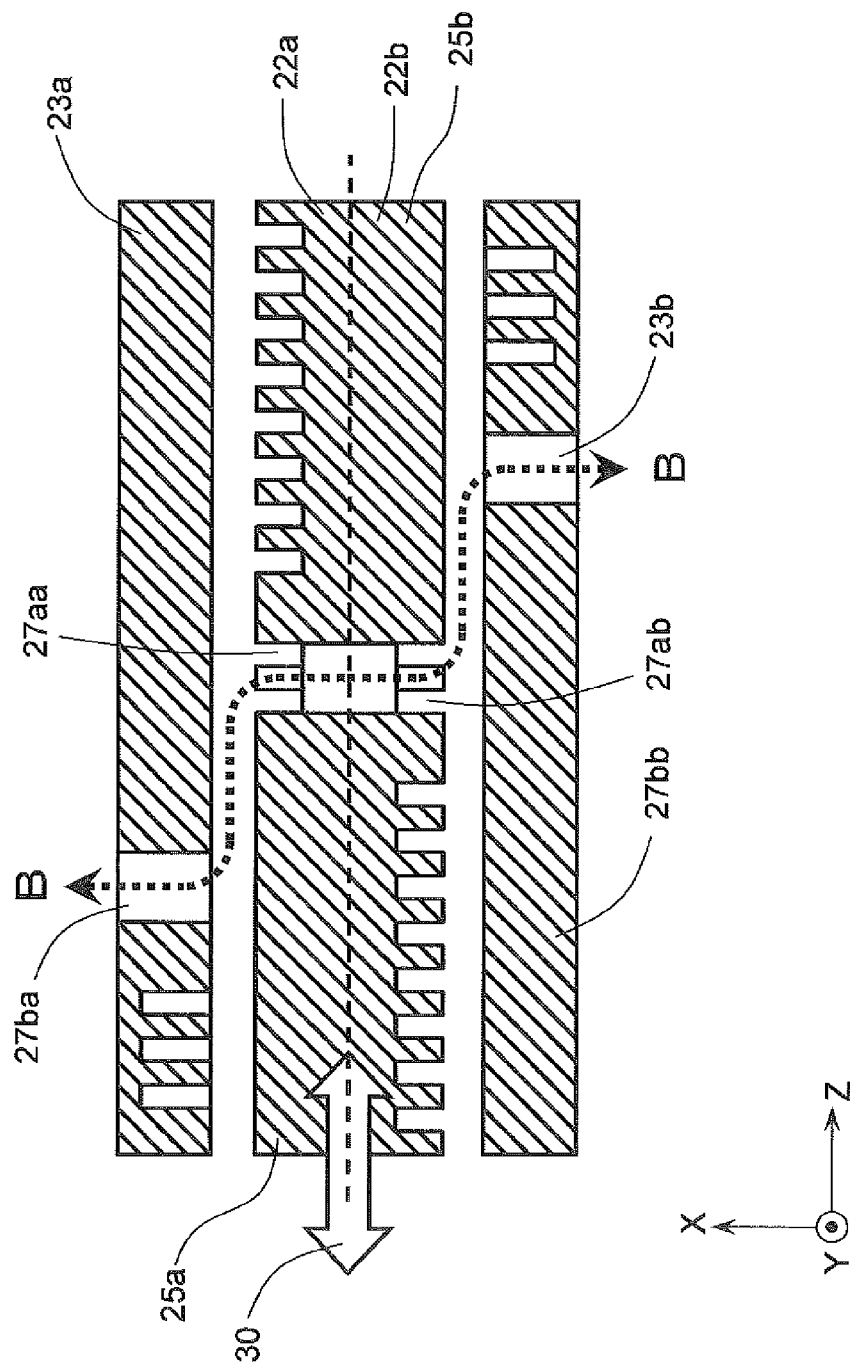
FIG. 9 is a cross section of a laminated type of fixed phase shifter pertaining to an embodiment of the present invention.

FIG. 9 is a cross section of a structure in which two of the phase shifters shown in FIG. 7 are used, and lower conductors 22a and 22b of the two phase shifters are laminated back to back, wherein this structure is cut along ridges 25a and 25b. With the structure shown in FIG. 9, the left and right orientation of the two phase shifters is the opposite of that in FIG. 8. Consequently, even when the intermediate conductor is slid in the direction of the arrow 30 in the drawing, there is no change in the waveguide length between the through-holes 27ba and 27bb (between B-B) via the through-holes 27aa and 27ab (linking paths). Thus, this structure can operate as a fixed phase shifter that does not change the phase of the high-frequency energy passing through B-B. As a result, this can be used in application where the goal is to allow the high-frequency energy to pass through, but with no change in the phase, between the upper and lower conductors 23a and 23b.

Let us continue this description by returning to FIGS. 2 and 3. The phase shifter and high-frequency waveguide described above are used inside the waveguide body 8 and the antenna body 7 of the antenna apparatus 6 in this embodiment.

When a phase shifter having the structure shown in FIGS. 7 and 8 is used for a phase array antenna that has a plurality of phase shifters (such as an onboard radar) and with which the ratio of the amount of shift between the plurality of phase shifters is kept constant while the amounts are simultaneously varied, the constitution is as follows.

Specifically, the lower conductor 22 and the upper conductor 23 are not slid directly, and a plurality of phase shifters in which the ridge 25 of FIG. 7 is arc-shaped are disposed in concentric circles with the same radius ratio, as shown in the detail diagrams of the plate bodies 12 to 17, as discussed below. A movable conductor plate (plate body 15) and stationary conductor plate (plate bodies 14 and 16) corresponding to the lower conductor 22 and upper conductor 23 in FIG. 7 are moved rotationally parallel to each other, with the rotational axis being the center of the concentric circles. That is, since the radius ratio of the ridges is constant, a phase shifter group is obtained with which the shift amounts are varied while a constant shift amount ratio is maintained with respect to a given rotational movement angle.

Specifically, with the antenna apparatus 6 of this embodiment, as shown in FIGS. 2 and 3, a waffle iron structure comprising columnar protrusions with a height of approximately λ/4, and a waveguide comprising a ridge provided along the transmission path of high-frequency energy are used. Accordingly, the plate body 12, the plate body 13, even though the plate body 14, the plate body 15, the plate body 16, and the plate body 17 do not come into physical contact, they are maintained in a state of being separated by a constant spacing, and there is no leakage of high-frequency energy to the surroundings. Also, the degree of coupling between adjacent lines or phase shifters is kept low. Thus, production and assembly will be simple, with no worry about poor contact due to aging. In particular, a low-loss antenna can be realized in the milliwave band of an onboard radar or the like. Furthermore, with the antenna apparatus 6 in this embodiment, the fact that the plate bodies 12 to 17 are not in physical contact is taken advantage of so that the plate body 15 of the waveguide body 8 in particular is moved rotationally at a specific spacing with respect to the plate body 14 and the plate body 16. Consequently, it is possible to realize a beam variable antenna that includes a phase shifter with a simple configuration.

Next, the flow of high-frequency energy will be described through reference to the detail drawings of the plate-like members constituting the antenna apparatus 6.

With the antenna apparatus 6 in this embodiment, high-frequency energy is sent once from the plate body 16 to the plate body 14, passing through the plate bodies 12 to 17. After this, it passes again through the plate bodies 14 and 15 and is returned to the plate body 16. It then passes through the plate bodies 16 and 15 again and reaches the plate body 14. Consequently, numerous phase shifters can be housed within a small area. This allows the overall size of the antenna apparatus 6 to be reduced.

The detail drawings will now be used to describe the flow of high-frequency energy during transmission in which the energy goes from the transceiver 9 to the waveguide body 8 and the antenna body 7 and is radiated ahead of the antenna apparatus 6. The flow of high-frequency energy during reception merely in the opposite direction from that during transmission, and overall the path is the same.

Figure 10:
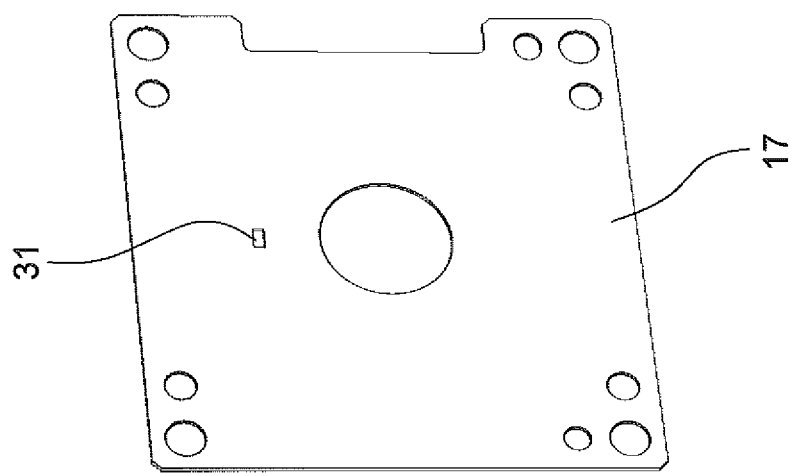
FIG. 10 is an oblique view of a sixth plate body as seen from the rear.
Figure 10:
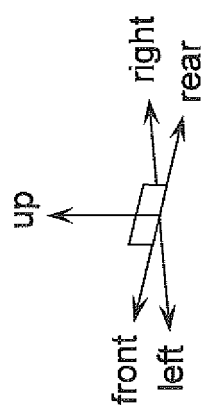

FIG. 10 is an oblique view of the plate body 17 of the waveguide body 8 as seen from the rear. The orientation display in the drawing corresponds completely to the orientation display in FIGS. 1 and 2, and the same holds true for the oblique views of other plate bodies discussed below.

In FIG. 10, the high-frequency energy outputted from the transceiver 9 is inputted through a through-hole 31 into the interior of the waveguide body 8. The inputted high-frequency energy enters a ridge end 32a of the plate body 16 in FIG. 11, and is transmitted along the ridge 32. It is then split into two branches, after which it enters through-holes 33 going to the front layer. The structure shown in FIG. 6 is used for the path here from the through-hole 31 to the through-holes 33.

In the description that follows, we will focus on just the high-frequency energy inputted to one of the two through-holes 33.

Figure 12:
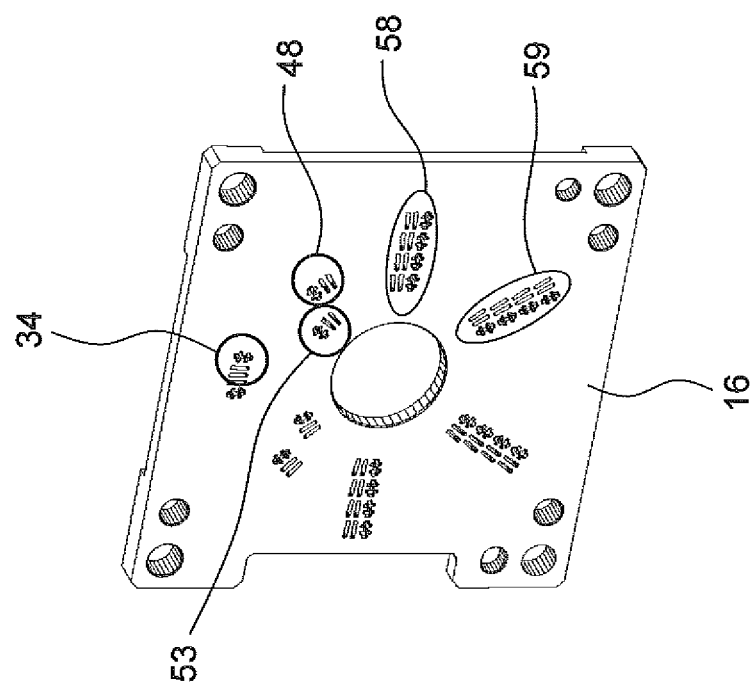
FIG. 12 is an oblique view of a fifth plate body as seen from the front.
Figure 12:
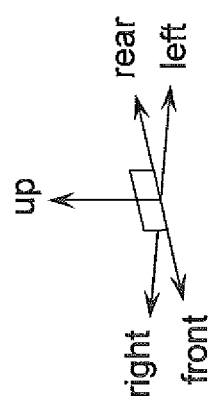

The high-frequency energy that has entered the through-hole 33 comes out a through-hole 34 of the plate body 16 in FIG. 12. The shape of all of the through-holes between the layers discussed below, including the through-holes 33 and 34, is that of a double-ridge rectangular waveguide having ridges on the two long sides of a rectangular waveguide, rather than the rectangular waveguide shown in FIGS. 6 and 7, so that high-frequency energy can be transmitted efficiently to the ridge of the upper and lower layers. Further, the through-holes of the phase shifter input and output components, including the through-hole 34, have a shape in which part of the short side of a rectangular waveguide bulges outward so as to conform to the ridge. A raised portion or cut-out is also provided to part of the ridge for conformity.

Let us now return to FIG. 12 to continue the description. The high-frequency energy coming out of the through-hole 34 in FIG. 12 goes into the ridge 35 of the plate body 15 in FIG. 13. The energy is transmitted along the ridge 35 and enters a through-hole 36 going to the front layer. The high-frequency energy that has entered the through-hole 36 goes out to the through-hole 37 in the plate body 15 in FIG. 14. The high-frequency energy that has gone out to the through-hole 37 is transmitted along the ridge and enters a through-hole 38 that goes through to the front layer of the plate body 14 in FIG. 15. Here, the structure shown in FIG. 9 is used for the path that links the through-holes 34, 36, 37, and 38. Consequently, even if the plate body 15 moves rotationally with respect to the plate bodies 13 and 16, there will be no change in the phase of the high-frequency energy from the through-holes 34 to 38.

Let us now return to FIG. 15 to continue the description. The high-frequency energy that has entered the through-hole 38 in FIG. 15 goes out to a through-hole 39 in the plate body 14 in FIG. 16, after which it is transmitted along the ridge. It is then split into two branches, and enters through-holes 40 and 41 that lead to the rear layer.

That is, as discussed above, the high-frequency energy inputted from the transceiver 9 to the through-hole 31 of the plate body 17 passes forward between the plate bodies 17, 16, and 15 and reaches the through-hole 39 in the plate body 14. After this, it passes rearward between the plate bodies 14 and 15 again and returns to the plate body 16, so the direction of progress of the high-frequency energy is reversed at the plate body 14.

Figure 13:
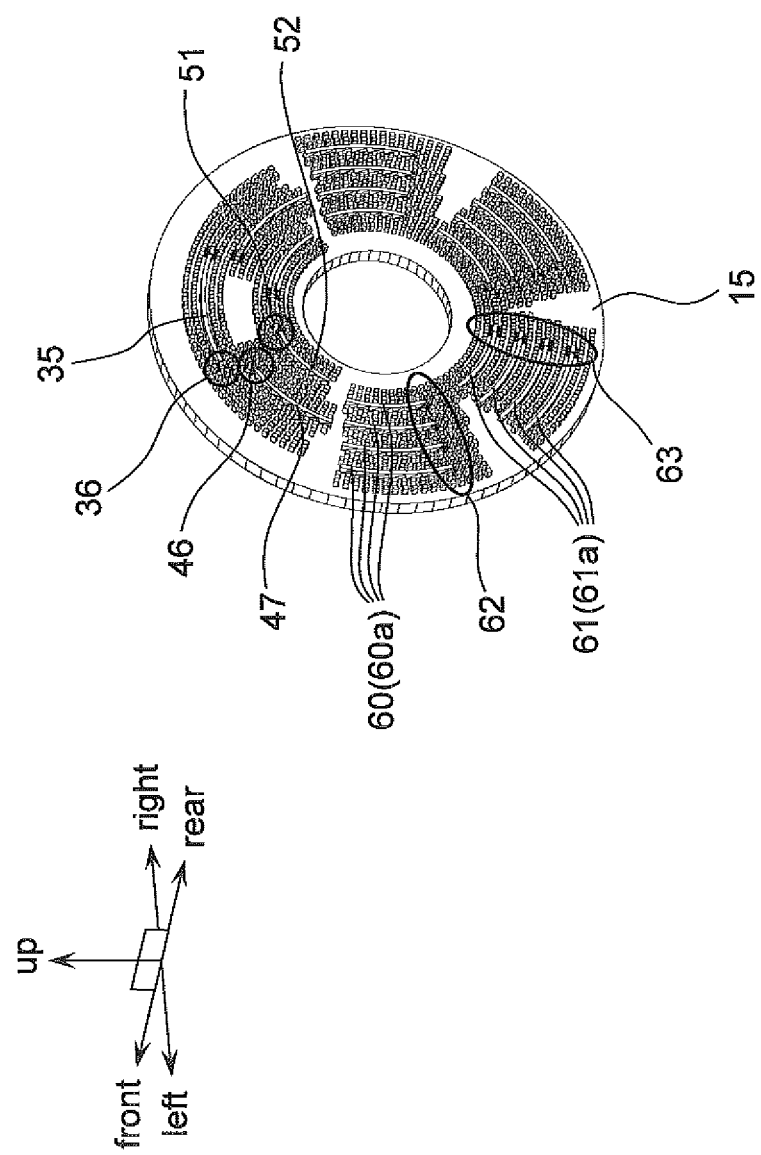
FIG. 13 is an oblique view of a fourth plate body as seen from the rear.
Figure 14:
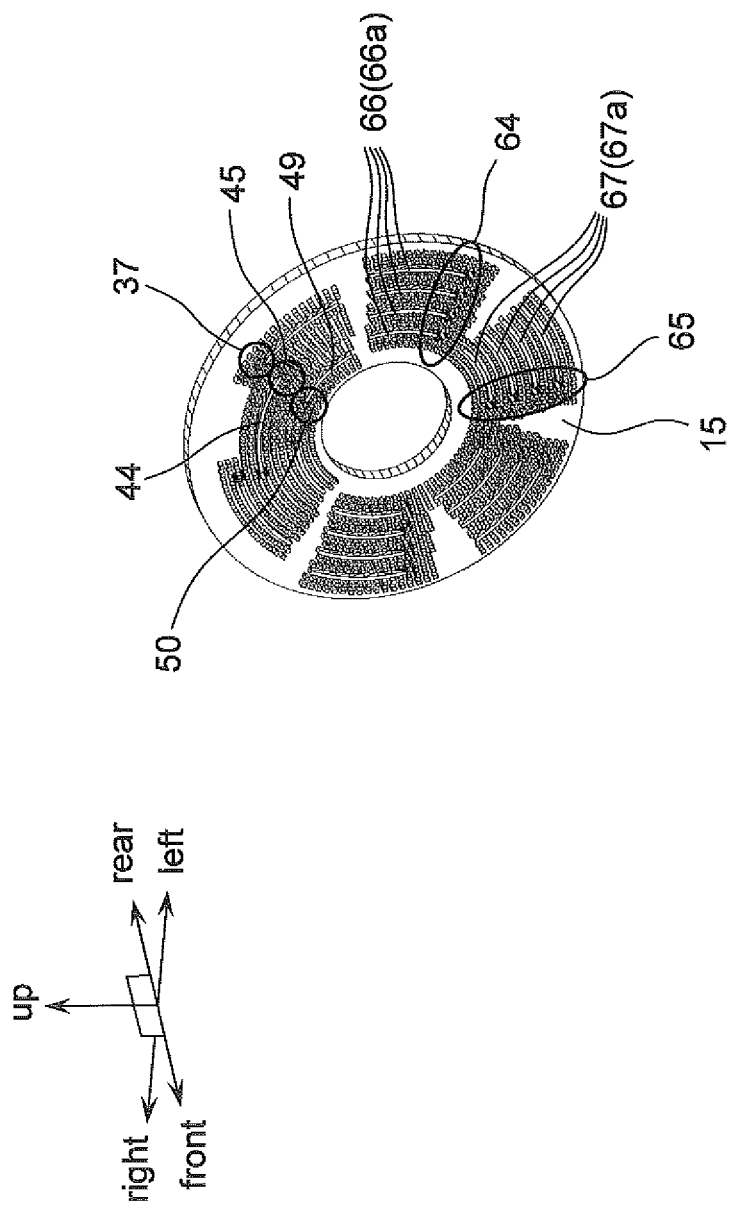
FIG. 14 is an oblique view of a fourth plate body as seen from the front.
Figure 15:
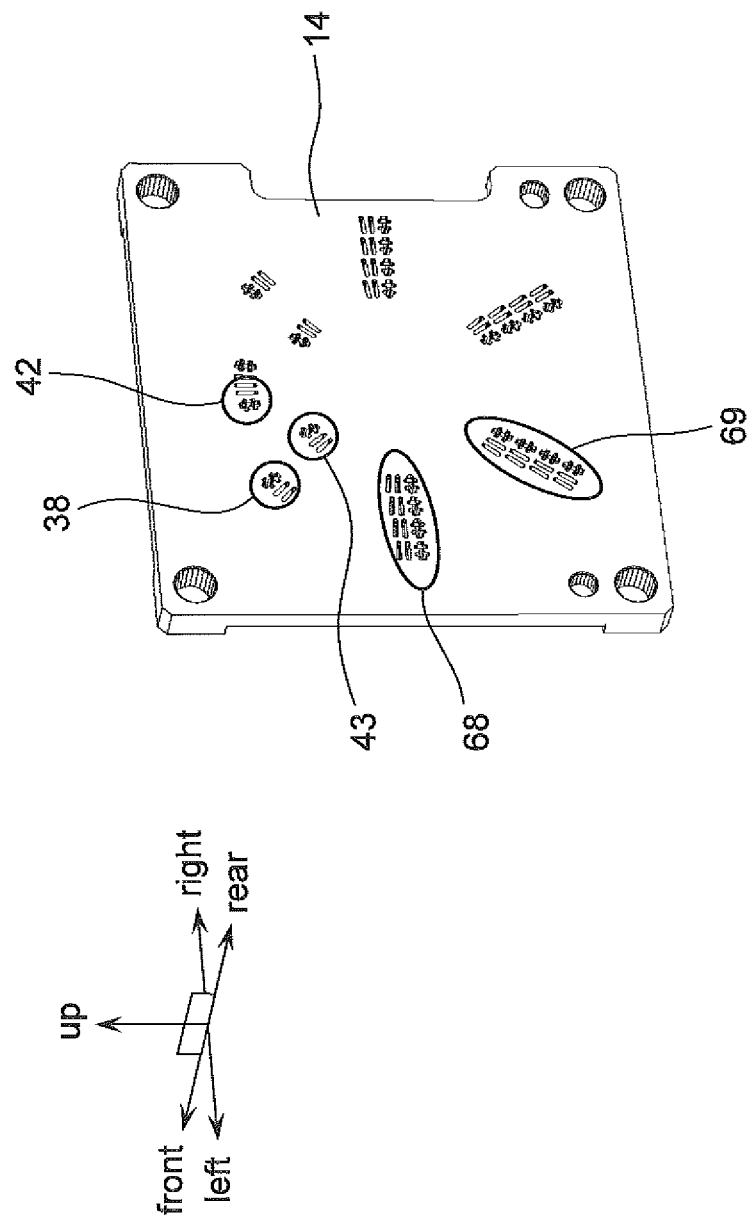
FIG. 15 is an oblique view of a third plate body as seen from the rear.

Let us now continue the description by focusing on the high-frequency energy that enters a through-hole 40. The high-frequency energy that enters the through-hole 40 comes out from a through-hole 42 in the plate body 14 in FIG. 15. The high-frequency energy that comes out of the through-hole 42 goes into a ridge 44 of the plate body 15 in FIG. 14, is transmitted along the ridge 44, and enters a through-hole 45 going to the rear layer. The high-frequency energy that enters the through-hole 45 goes out into a through-hole 46 in the plate body 15 in FIG. 13. The high-frequency energy that comes out from the through-hole 46 is transmitted along a ridge 47, and goes from the ridge 47 into a through-hole 48 going to the rear layer of the plate body 16 in FIG. 12. Here, the structure shown in FIG. 9 is also used for the path that links the through-holes 42, 45, 46, and 48. Thus, even if the plate body 15 moves rotationally with respect to the plate bodies 14 and 16, there will be no change in the phase of the high-frequency energy between the through-hole 42 and the through-hole 48.

Let us continue this description by returning to FIG. 16. The high-frequency energy that has entered the through-hole 41 comes out from the through-hole 43 in the plate body 14 in FIG. 15. The high-frequency energy that has come out of the through-hole 43 goes into a ridge 49 of the plate body 15 in FIG. 14, is transmitted along the ridge 49, and enters a through-hole 50 going to the rear layer. The high-frequency energy that has entered the through-hole 50 goes out to a through-hole 51 in the plate body 15 in FIG. 13, is transmitted along a ridge 52, and enters a through-hole 53 going to the rear layer of the plate body 16 in FIG. 12. The structure shown in FIG. 8 is also used for the path that links the through-holes 43, 50, 51, and 53. Thus, when the plate body 15 moves rotationally with respect to the 14 and 16, there is a change in the phase of the high-frequency energy between the through-hole 43 and the through-hole 53.

So far we have separately described the two paths that the high-frequency energy that has entered the two through-holes 40 and 41 in FIG. 16 takes up to entering the through-holes 48 and 53 in FIG. 12, respectively, but from here on the two paths will be described collectively.

The high-frequency energy that has entered the through-holes 48 and 53 shown in FIG. 12 comes out from the through-holes 54 and 55, respectively, in the plate body 16 in FIG. 11. After this, it is transmitted along ridges 32b and 32c, is split into four branches each, and enters through-holes 56 and 57 going to the front.

That is, as discussed above, the high-frequency energy that has been outputted from the transceiver 9, passed forward through the plate bodies 17, 16, and 15 to reach the plate body 14, and then passed rearward back through the plate bodies 15, 16, and 17 and returned to the plate body 16 once again passes through the plate bodies 16, 15, and 14 and reaches the plate body 14, so the progress direction at the plate body 16 is reversed.

The high-frequency energy that has entered the through-holes 56 and 57 comes out from through-holes 58 and 59 in the plate body 16 in FIG. 12. After this, the high-frequency energy enters positions 60a and 61a on ridges 60 and 61 of the plate body 15 in FIG. 13, is transmitted over the four ridges 60 and 61, and enters through-holes 62 and 63 going to the front.

The high-frequency energy that has entered the through-holes 62 and 63 goes out to through-holes 64 and 65 in the plate body 15 in FIG. 14. After this, the high-frequency energy it is transmitted via the four ridges 66 and 67 and enters through-holes 68 and 69 going to the front layer of the plate body 14 in FIG. 15 from positions 66a and 67a on the ridges 66 and 67. The structure shown in FIG. 8 is used for the path that links the through-holes 58, 62, 64, and 68 and the through-holes 59, 63, 65, and 69. Thus, when the plate body 15 moves rotationally with respect to the plate bodies 14 and 16, there is a change in the phase of the high-frequency energy between the through-hole 58 and the through-hole 68, and between the through-hole 59 and the through-hole 69.

Figure 16:
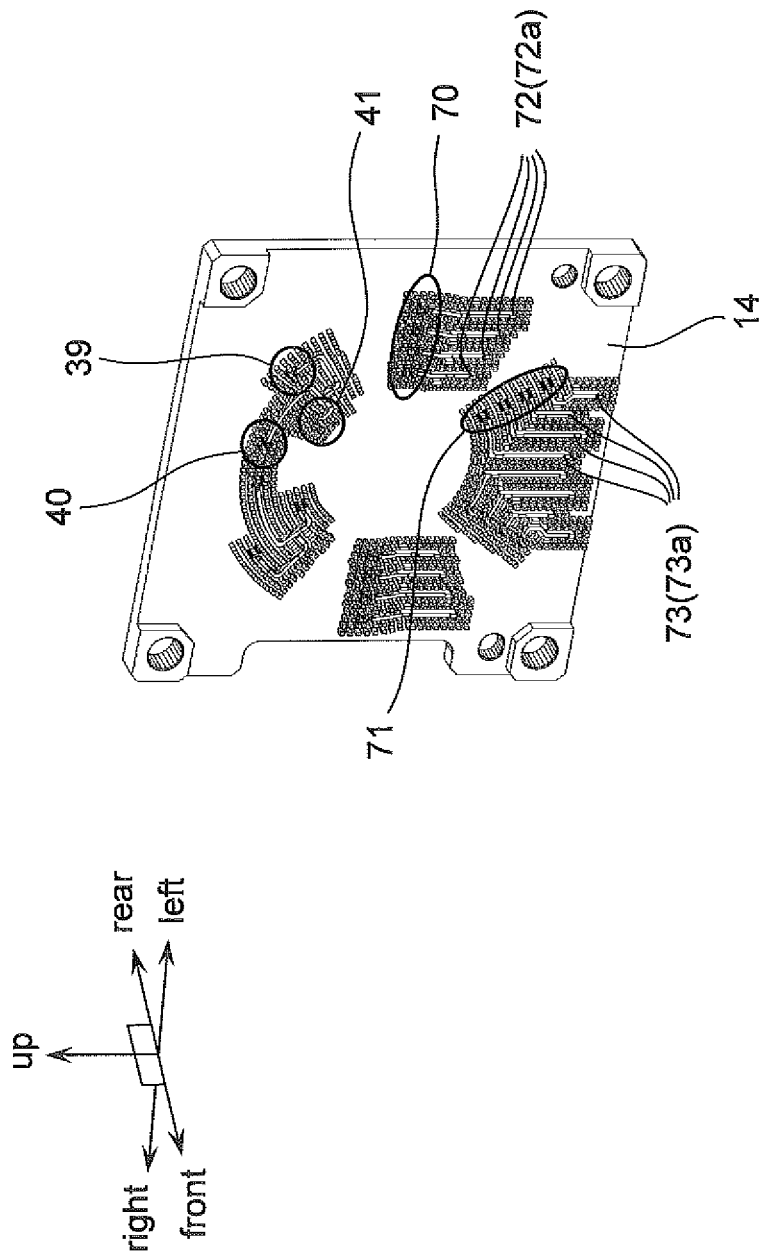
FIG. 16 is an oblique view of a third plate body as seen from the front.
Figure 17:
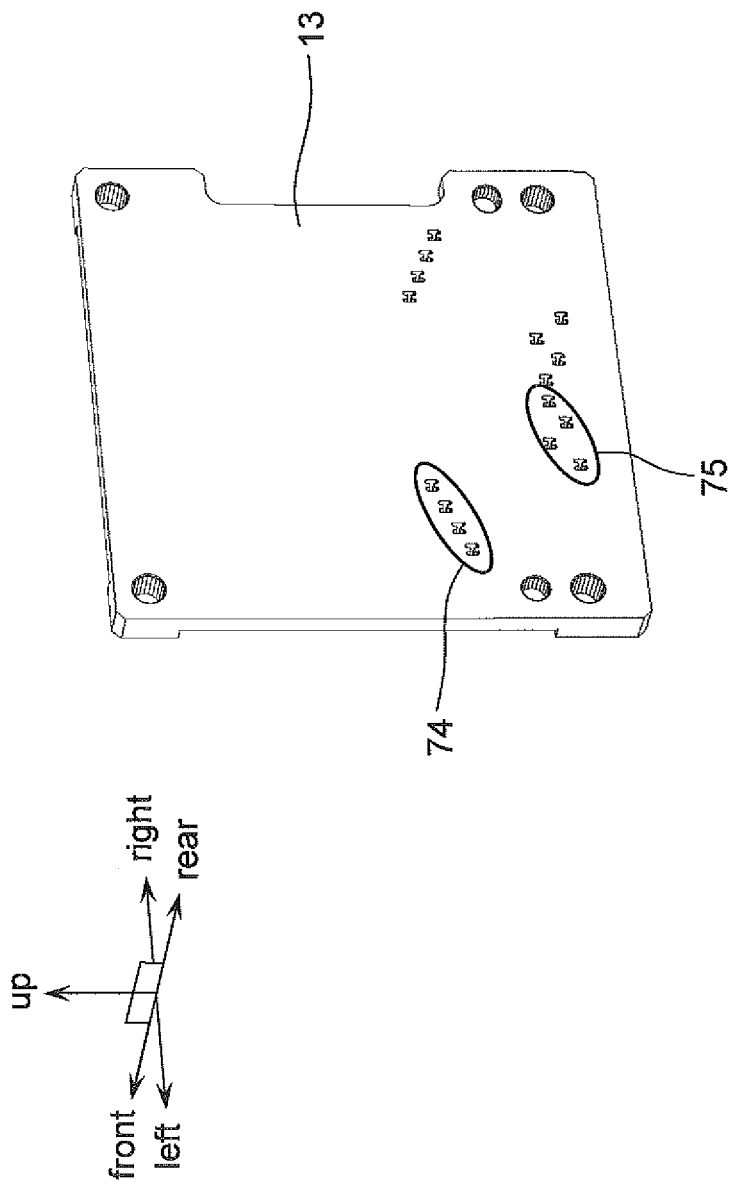
FIG. 17 is an oblique view of a second plate body as seen from the rear.

Furthermore, the high-frequency energy that has entered the through-holes 68 and 69 comes out from through-holes 70 and 71 in the plate body 14 in FIG. 16. After this, it is transmitted over four ridges 72 and 73, and enters through-holes 74 and 75 in the plate body 13 in FIG. 17 from positions 72a and 73a on the ridges 72 and 73. The high-frequency energy further comes out from through-holes 76 and 77 in the plate body 13 in FIG. 18.

The high-frequency energy that has come out from the through-holes 76 and 77 resonates on four ridges 78 and 79, which are waveguides used to excite radiation elements. The resonance current on the ridges 78 and 79 also resonates radiation element groups 12a and 12b formed on the plate body 12 in FIG. 19. Finally, the resonance magnetic flow of the radiation element groups 12a and 12b becomes a radiation source, and high-frequency energy is radiated toward the front space of the antenna apparatus 6.

Figure 19:
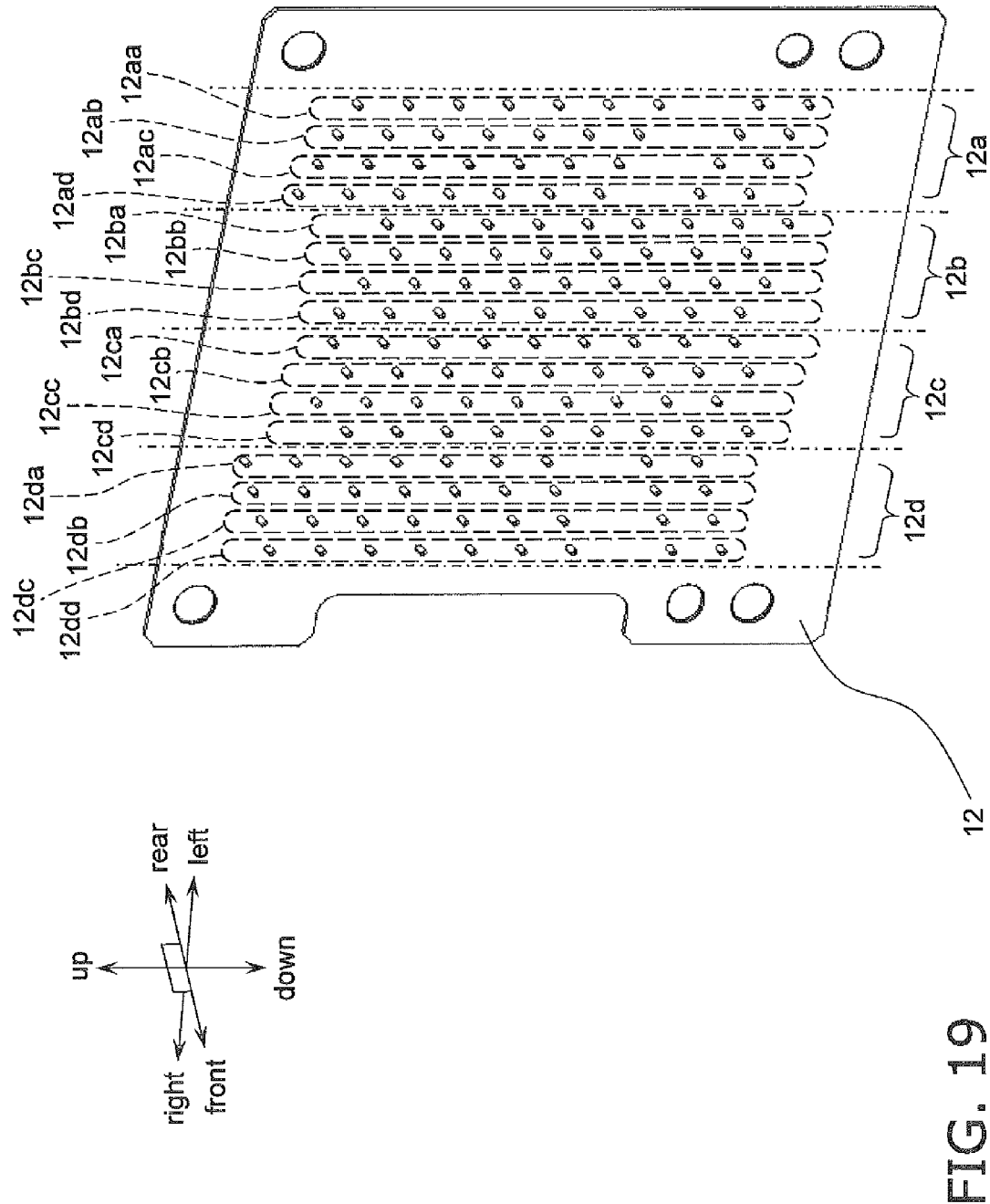
FIG. 19 is an oblique view of a first plate body as seen from the front.

In the above description, the flow of high-frequency energy that entered one of the through-holes 33 in FIG. 11 was described, but the high-frequency energy that enters the other through-hole 33 passes through the same path and is radiated toward the front space from radiation element groups 12c and 12d in FIG. 19. However, as shown in the detail diagrams, the radiation element group 12 and the radiation element group 12b, and the radiation element group 12c and the radiation element group 12d form left and right symmetry in the shape of the phase shifters passed through. Accordingly, when the plate body 15 moves rotationally, the phase signs of the variable phase shifters have mutually opposing polarity.

As discussed above, with the antenna apparatus 6 in this embodiment, the configuration comprises a combination of a plurality of transmission paths, including those with which the phase of high-frequency energy changes or does not change when the plate body 15 is moved rotationally with respect to the plate bodies 14 and 16.

As to the operating principle behind a beam variable antenna, it is well known that this can be obtained by imparting a specific phase difference between adjacent radiation elements and varying this phase difference. It is also well known that the density of the radiation elements must be raised in order to reduce scattering of radio waves in unwanted directions and raise the gain of the antenna.

Thus, with the antenna apparatus 6 in this embodiment, a plurality of arc-shaped phase shifters are disposed in concentric circles with the same radius ratio. Consequently, when the plate body 15 moves rotationally with respect to the plate bodies 14 and 16, a phase difference can be generated that is proportional to the radius ratio of the phase shifters. Furthermore, as shown in FIG. 19, a layout can be employed in which the density of radiation element rows 12aa to 12ad, 12ba to 12bd, 12ca to 12cd, and 12da to 12dd is raised in the left and right direction. These radiation element rows 12aa to 12ad, 12ba to 12bd, 12ca to 12cd, and 12da to 12dd are a group of radiation elements constituted by disposing a plurality of radiation elements in the up and down direction.

Figure 20:
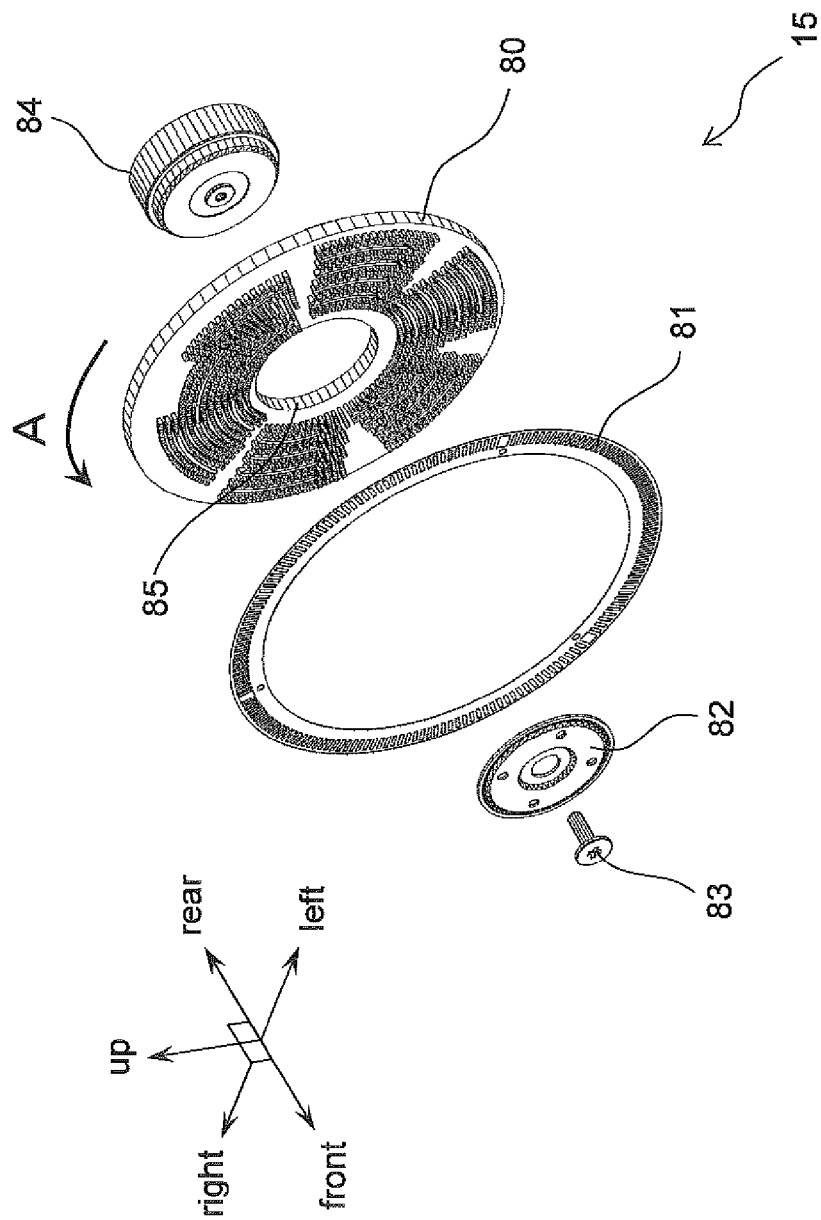
FIG. 20 is an exploded oblique view of a fourth plate body.

However, as shown in FIG. 20, the means for rotationally moving the plate body 15 is constituted by a disk-shaped plate body 80, a position detection plate 81, a clamping plate 82, a screw 83, and a motor 84. The motor 84 must be installed in a hole 85 in the center of the plate body 15. Accordingly, there is a restriction in that a phase shifter cannot be disposed in the center of the disk-shaped plate body 80.

This restriction poses an inconvenience in that the phase difference between the radiation element row 12db and the radiation element row 12cd (see FIG. 19) corresponding to the phase shifter to be located at the center of the plate body 15 cannot be made the same as the phase difference between other adjacent radiation element rows.

Thus, with the antenna of this embodiment, as in the description of the flow of high-frequency energy above, this problem is solved by combining a variable phase shifter comprising a transmission path on which the phase changes when the plate body 15 is moved rotationally, and a fixed phase shifter comprising a transmission path on which the phase does not change.

The phase shifter layout in this embodiment will now be described.

Figure 21:
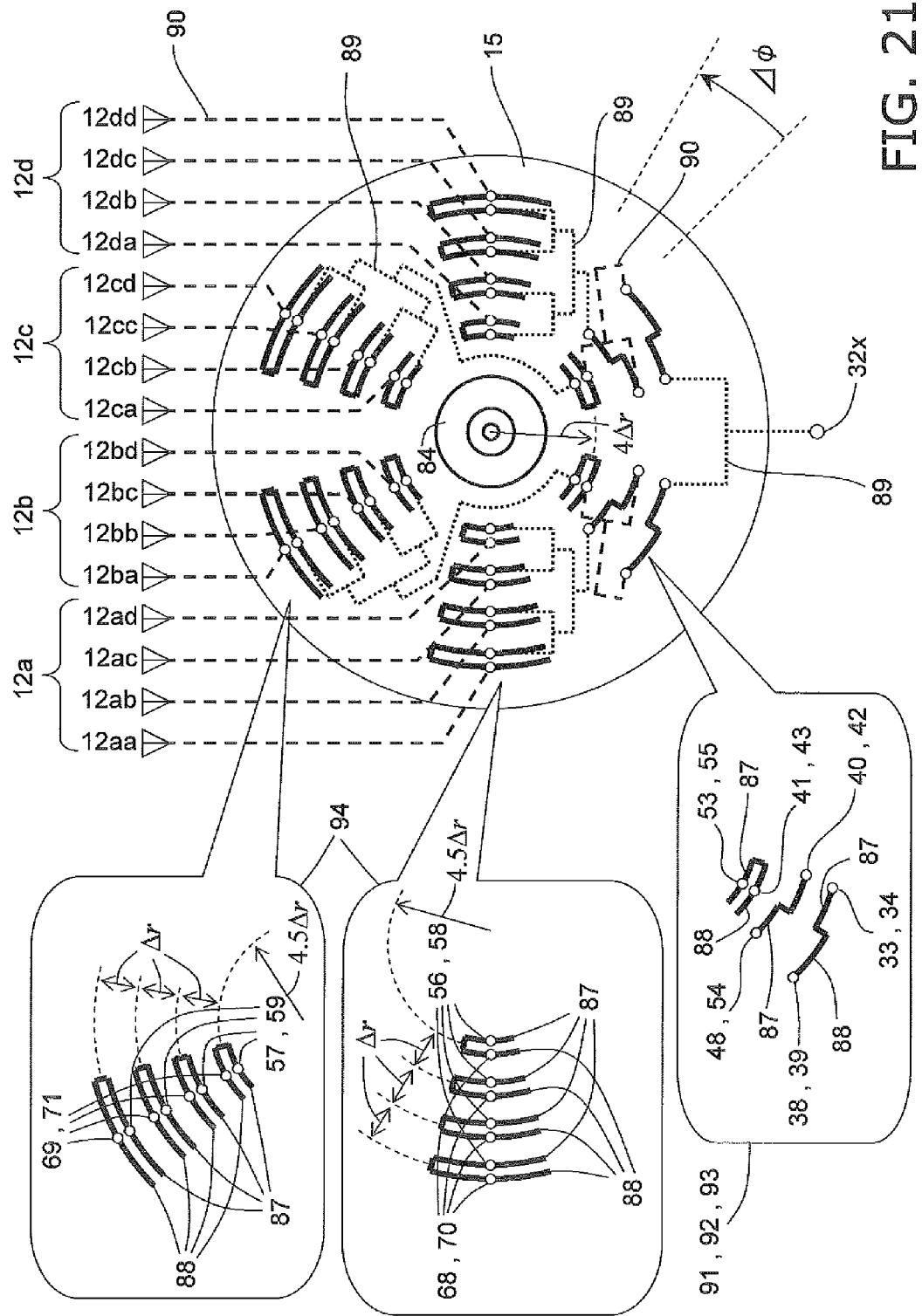
FIG. 21 is a layout diagram of the phase shifter of a beam variable antenna pertaining to an embodiment of the present invention.
Figure 22:
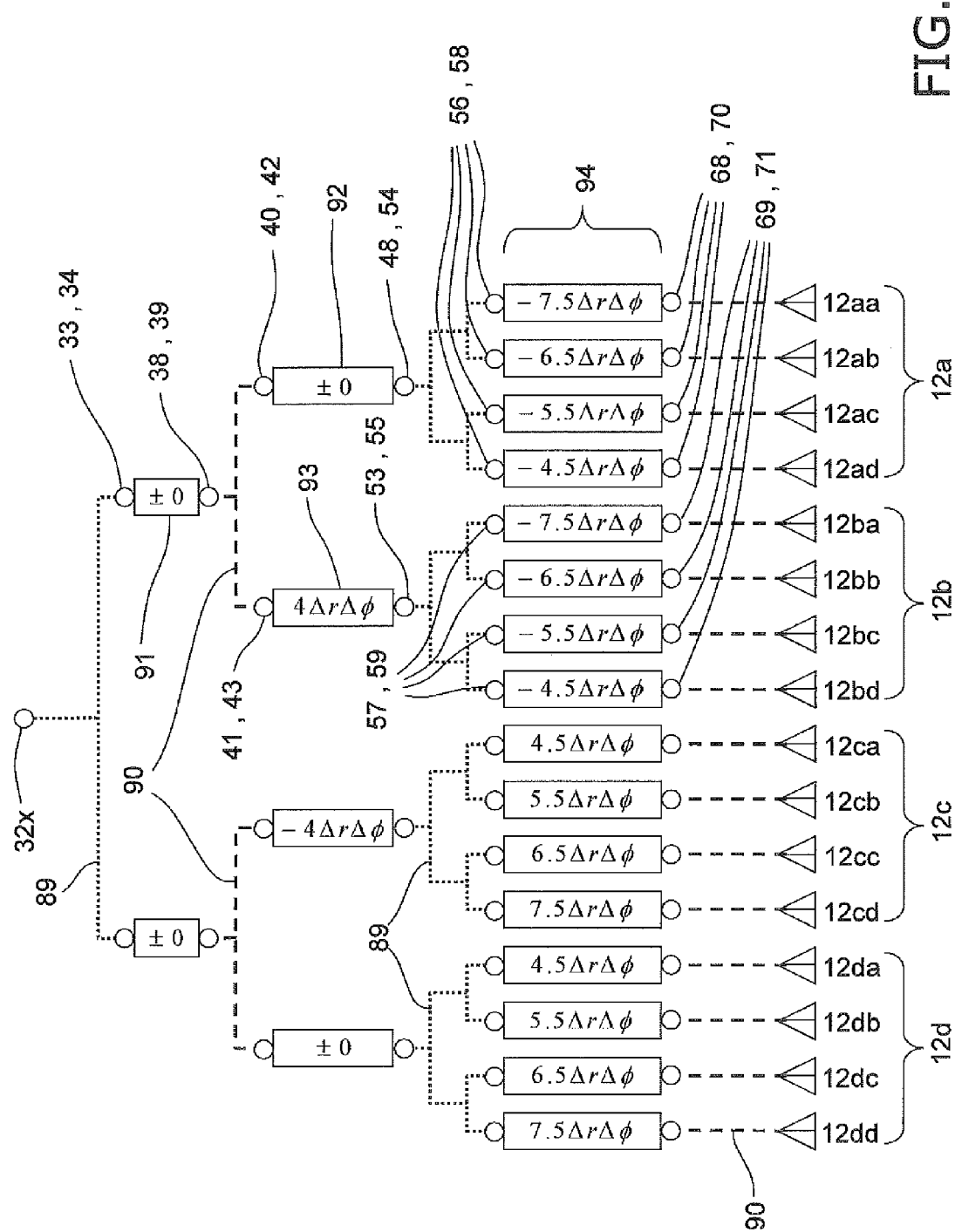
FIG. 22 is a phase relation diagram for a beam variable antenna pertaining to an embodiment of the present invention.

FIG. 21 is a diagram of the phase shifter layout in the antenna apparatus 6 pertaining to this embodiment (beam variable antenna), and FIG. 22 is a diagram of the phase relationships in the antenna apparatus 6 pertaining to this embodiment.

As shown in FIGS. 21 and 22, the antenna apparatus 6 of this embodiment has an input terminal 32x and radiation element groups 12a to 12d. Here, as shown in FIG. 19, the radiation element groups 12a to 12d correspond to slotted radiation element rows 12aa to 12ad, 12ba to 12bd, 12ca to 12cd, and 12da to 12dd, a plurality of which are arranged in the up and down direction.

In FIGS. 21 and 22, the points corresponding to the through-holes 33, 34, 38, 39, 40, 41, 42, 43, 48, 53, 55, 56, 57, 58, 59, 68, 69, 70, and 71 that connect the above-mentioned plate bodies 12 to 17 are indicated with circles. The lines corresponding to the high-frequency waveguides provided to the plate bodies 12 to 17 are indicated by the two solid lines 87 and 88 and the two dotted lines 89 and 90.

The dotted line 89 indicates a high-frequency waveguide comprising a ridge provided to the rear of the plate body 16, and the dotted line 90 indicates a high-frequency waveguide comprising a ridge provided to the front of the plate body 15. The solid line 87 indicates a high-frequency waveguide comprising a ridge provided to the rear of the plate body 15, and the solid line 88 indicates a high-frequency waveguide comprising a ridge provided to the front of the plate body 15. As shown in the call-outs in FIG. 21, arc-shaped solid lines shown on the inside indicate a high-frequency waveguide 87, while arc-shaped solid lines shown on the outside indicate a high-frequency waveguide 88.

The numbers 91, 92, 93, and 94 in FIG. 22 indicate the phase shifters shown in FIG. 21. The notations on the phase shifters indicate the amount of change in waveguide length corresponding to the amount of movement of each phase shifter when the plate body 15 moves rotationally by $\Delta\phi/2$ in the arrow direction in FIG. 21. In FIGS. 21 and 22, the radiation element rows 12aa to 12ad, 12ba to 12bd, 12ca to 12cd, and 12da to 12dd are shown in the same order of arrangement. Thus, the total amount of phase shift in the high-frequency energy supplied when the plate body 15 in FIG. 21 has rotated by $\Delta\phi/2$ in the arrow direction is obtained by summing up the amounts of change in waveguide length noted on the phase shifters 91 to 94 of the radiation element rows 12aa to 12dd from the input terminal 32x in FIG. 22.

Figure 18:
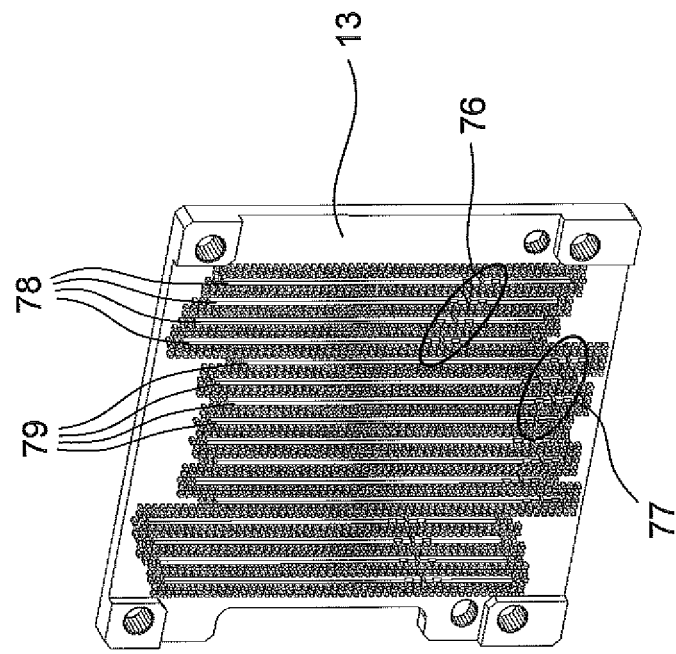
FIG. 18 is an oblique view of a second plate body as seen from the front.
Figure 18:
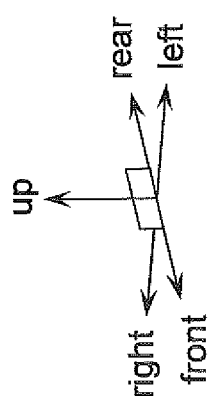

The phase shifters 93 and 94 in FIG. 22 here are variable phase shifters with which the amount of phase shift changes with the plate body 15 shown in FIG. 18 moves rotationally. The phase shifters 91 and 92 are fixed phase shifters with which the amount of phase shift does not change even though the plate body 15 shown in FIG. 9 moves rotationally. In FIG. 21, the connection shapes of the high-frequency waveguides 87 and 88 of these two kinds of phase shifter are depicted so as to correspond to the shapes of the high-frequency energy paths A-A and B-B in FIGS. 8 and 9.

The radius from the rotational movement center of the plate body 15 of the high-frequency waveguide of the phase shifter 93 is $4\Delta r$ as shown in FIGS. 21 and 22. The radius from the rotational movement center of the plate body 15 of the high-frequency waveguide of the phase shifters 94 is $4.5\Delta r$, $5.5\Delta r$, $6.5\Delta r$, and $7.5\Delta r$, respectively, in that order from the inside.

Thus, when the amounts of change in the waveguide length of the phase shifters of radiation element rows 12aa to 12dd from the input terminal 32x in FIG. 22 are summed up while taking into account the signs contributed by combination of the direction of rotational movement of $\Delta\phi$ and the layout of the phase shifters 91 to 94 when the plate body 15 has moved rotationally by $\Delta\phi/2$, the difference in the amounts of change in waveguide length between the mutually adjacent radiation element rows 12aa and 12ab, the radiation element rows 12ab and 12ac, ... the radiation element rows 12db and 12dc, and the radiation element rows 12dc and 12dd is $\Delta r\Delta\phi$ in every case, as follows.

Radiation element row 12aa: $\pm 0 \pm 0 - 7.5\Delta r\Delta\phi = -7.5\Delta r\Delta\phi$
Radiation element row 12ab: $\pm 0 \pm 0 - 6.5\Delta r\Delta\phi = -6.5\Delta r\Delta\phi$
Radiation element row 12ac: $\pm 0 \pm 0 - 5.5\Delta r\Delta\phi = -5.5\Delta r\Delta\phi$
Radiation element row 12ad: $\pm 0 \pm 0 - 4.5\Delta r\Delta\phi = -4.5\Delta r\Delta\phi$
Radiation element row 12ba: $\pm 0 + 4\Delta r\Delta\phi - 7.5\Delta r\Delta\phi = -3.5\Delta r\Delta\phi$
Radiation element row 12bb: $\pm 0 + 4\Delta r\Delta\phi - 6.5\Delta r\Delta\phi = -2.5\Delta r\Delta\phi$
Radiation element row 12bc: $\pm 0 + 4\Delta r\Delta\phi - 5.5\Delta r\Delta\phi = -1.5\Delta r\Delta\phi$
Radiation element row 12bd: $\pm 0 + 4\Delta r\Delta\phi - 4.5\Delta r\Delta\phi = -0.5\Delta r\Delta\phi$
Radiation element row 12ca: $\pm 0 - 4\Delta r\Delta\phi + 4.5\Delta r\Delta\phi = 0.5\Delta r\Delta\phi$
Radiation element row 12cb: $\pm 0 - 4\Delta r\Delta\phi + 5.5\Delta r\Delta\phi = 1.5\Delta r\Delta\phi$
Radiation element row 12cc: $\pm 0 - 4\Delta r\Delta\phi + 6.5\Delta r\Delta\phi = 2.5\Delta r\Delta\phi$
Radiation element row 12cd: $\pm 0 - 4\Delta r\Delta\phi + 7.5\Delta r\Delta\phi = 3.5\Delta r\Delta\phi$
Radiation element row 12da: $\pm 0 \pm 0 + 4.5\Delta r\Delta\phi = 4.5\Delta r\Delta\phi$
Radiation element row 12db: $\pm 0 \pm 0 + 5.5\Delta r\Delta\phi = 5.5\Delta r\Delta\phi$
Radiation element row 12dc: $\pm 0 \pm 0 + 6.5\Delta r\Delta\phi = 6.5\Delta r\Delta\phi$
Radiation element row 12dd: $\pm 0 \pm 0 + 7.5\Delta r\Delta\phi = 7.5\Delta r\Delta\phi$ Consequently, among the radiation element rows 12ba to 12bd and the radiation element rows 12ca to 12cd included in the radiation element group 12b and the radiation element group 12c in FIG. 19, it is possible to impart a phase difference between mutually adjacent radiation element rows 12db and 12ca in the same amount as between other radiation element rows. As shown in FIGS. 21 and 22, this is accomplished by providing and combining a variable phase shifter that varies the phase when the plate body 15 is moved rotationally, and a fixed phase shifter that does not vary the phase.

Specifically, the plurality of waveguides formed in the waveguide body 8 form a variable phase shifter with which the phase of transmitted radio waves varies, and a fixed phase shifter that imparts a fixed phase amount according to the fixed transmission path length, regardless of the movement of the plate body 15, when the plate body 15 (a movable waveguide body) rotates (or moves rotationally) and moves relatively with respect to the plate body 14, the plate body 16, and the plate body 13.

Figure 27:
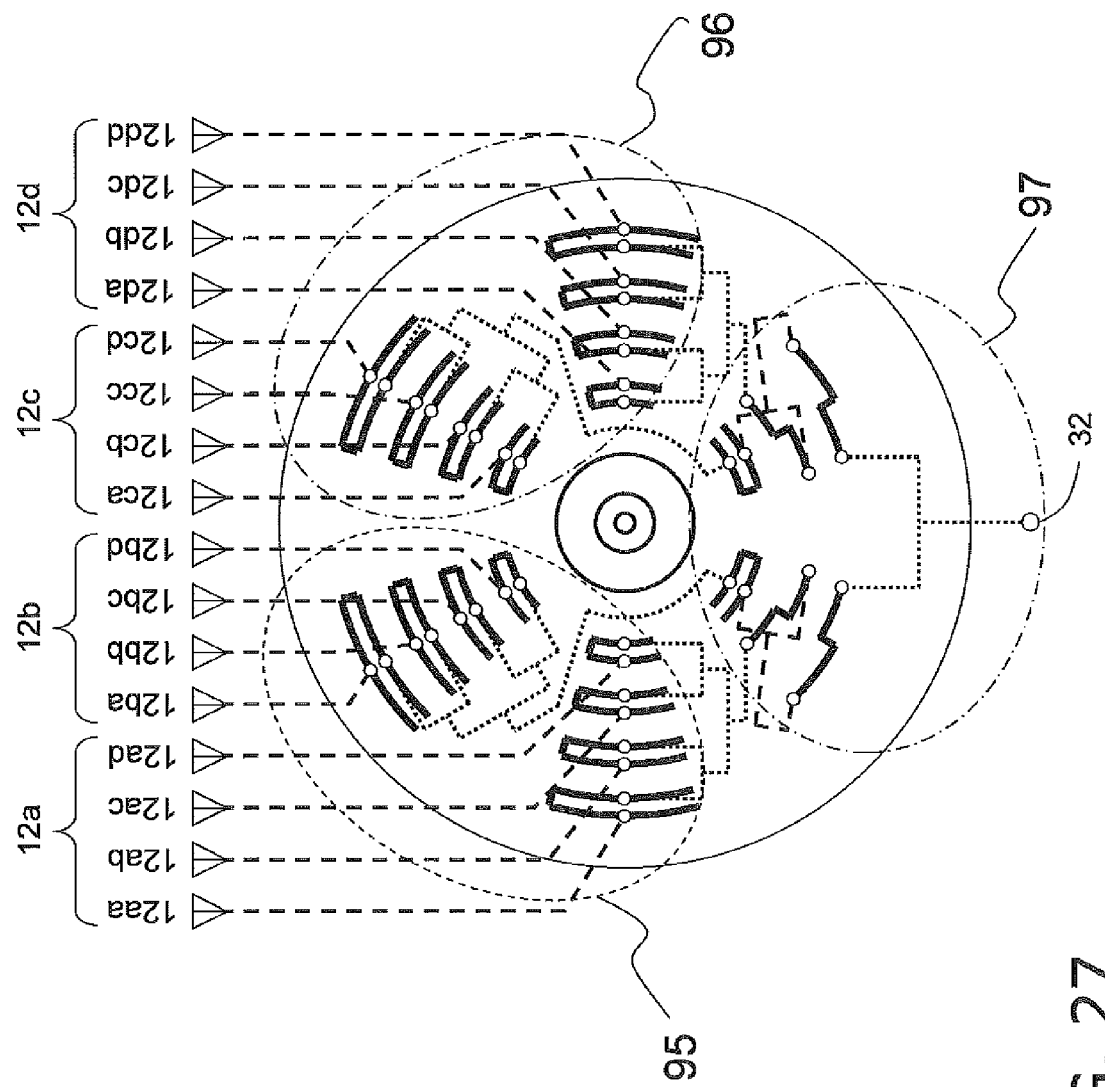
FIG. 27 is a layout diagram for a phase shifter of a beam variable antenna pertaining to an embodiment of the present invention.

In the relation between the radiation element groups 12a, 12b, 12c, and 12d, the plurality of waveguides of the waveguide body 8 form a first waveguide (95 in FIG. 27), a second waveguide (96 in FIG. 27), and a third waveguide (97 in FIG. 27).

The first waveguide is constituted by a plurality of waveguides corresponding to first radiation element groups 12a and 12b. The second waveguide is constituted by a plurality of waveguides corresponding to second radiation element groups 12c and 12d. The third waveguide matches the waveguide length difference between radiation element row 12bd of the first radiation element group and the radiation element row 12ca of the second radiation element group to $\Delta r*\Delta\theta$ (that is, the sum of $\Delta r$ and $\Delta\theta$), which is the waveguide length difference between other adjacent radiation element rows.

Consequently, the phase difference between mutually adjacent radiation element rows among all of the radiation element rows 12aa to 12ad, 12ba to 12bd, 12ca to 12cd, and 12da to 12dd can be made uniform in all cases, so scattering of radio waves in unnecessary directions can be reduced.

That is, since the incidence/emission efficiency of radio waves with respect to the opening surface area of antennas having a given opening surface area can be increased, so an antenna having the same efficiency can be made more compact.

That is, with the antenna apparatus 6 pertaining to this embodiment, the motor 84 must be installed in the center of the plate body 15 constituting a phase shifter. Accordingly, when there is a limitation in that a phase shifter cannot be disposed in the center, a variable phase shifter that varies the phase when the plate body 15 is moved rotationally is combined with a fixed phase shifter that does not vary the phase. Consequently, a phase difference that is the same as that between other adjacent radiation element rows can be imparted between the adjacent radiation element rows 12bd and 12ca among the radiation element rows 12ba to 12cd included in the radiation element groups 12b and 12c in FIG. 19. Thus, it is possible to raise the gain of the antenna apparatus 6.

Other Embodiments (A)

An antenna apparatus was described above in which the scattering of radio waves in unnecessary directions in the left and right direction in FIG. 1 was reduced. The present invention is not limited to this, however. For example, the antenna apparatus may be such that the scattering of radio waves in unnecessary directions in the up and down direction in FIG. 1 is reduced.

The means for improving the recognition accuracy of an onboard radar when the antenna apparatus 6 of this embodiment is applied to an onboard radar will now be described.

Figure 23:
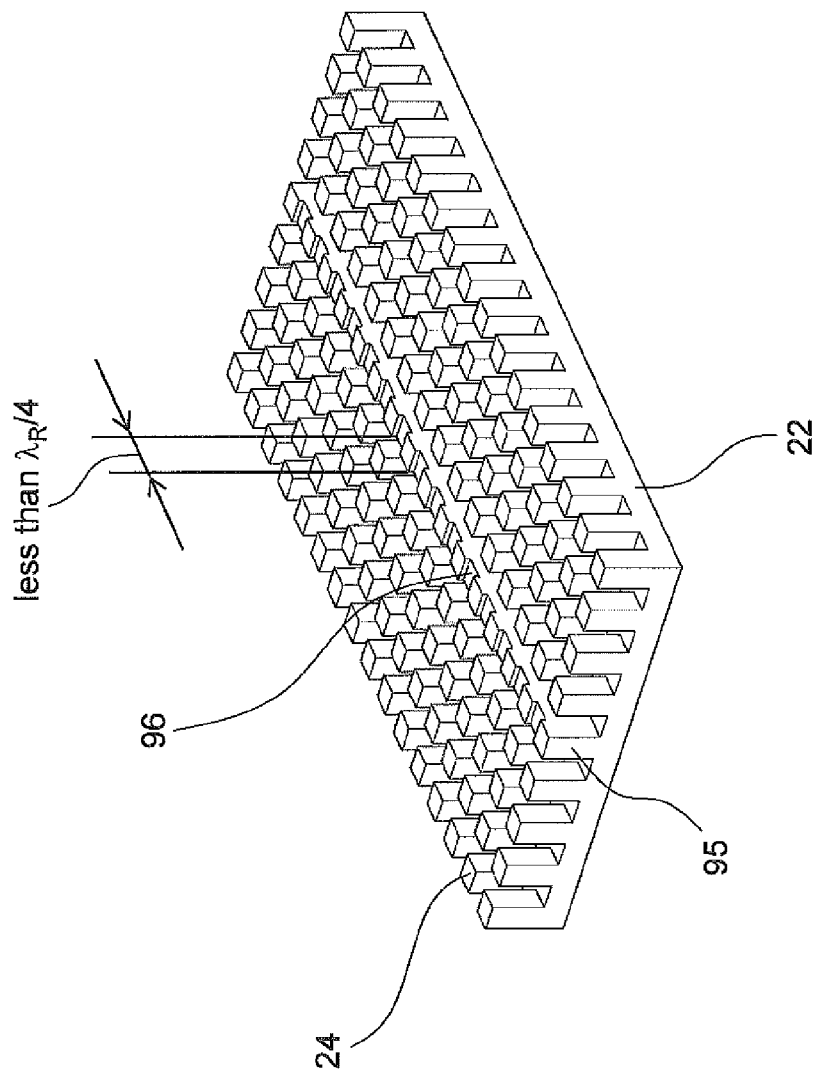
FIG. 23 is an oblique view of a high-frequency waveguide in which the ridge height is variable periodically.
Figure 24:
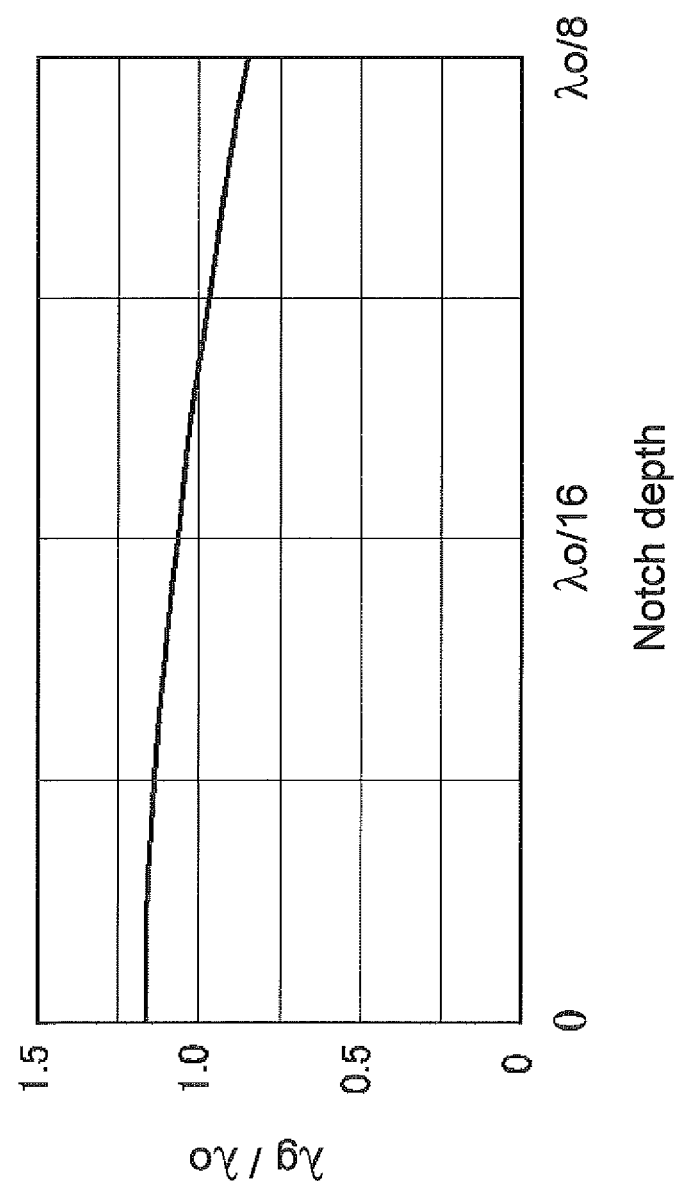
FIG. 24 is a wavelength graph of a high-frequency waveguide in which the ridge height is variable periodically.
Figure 25:
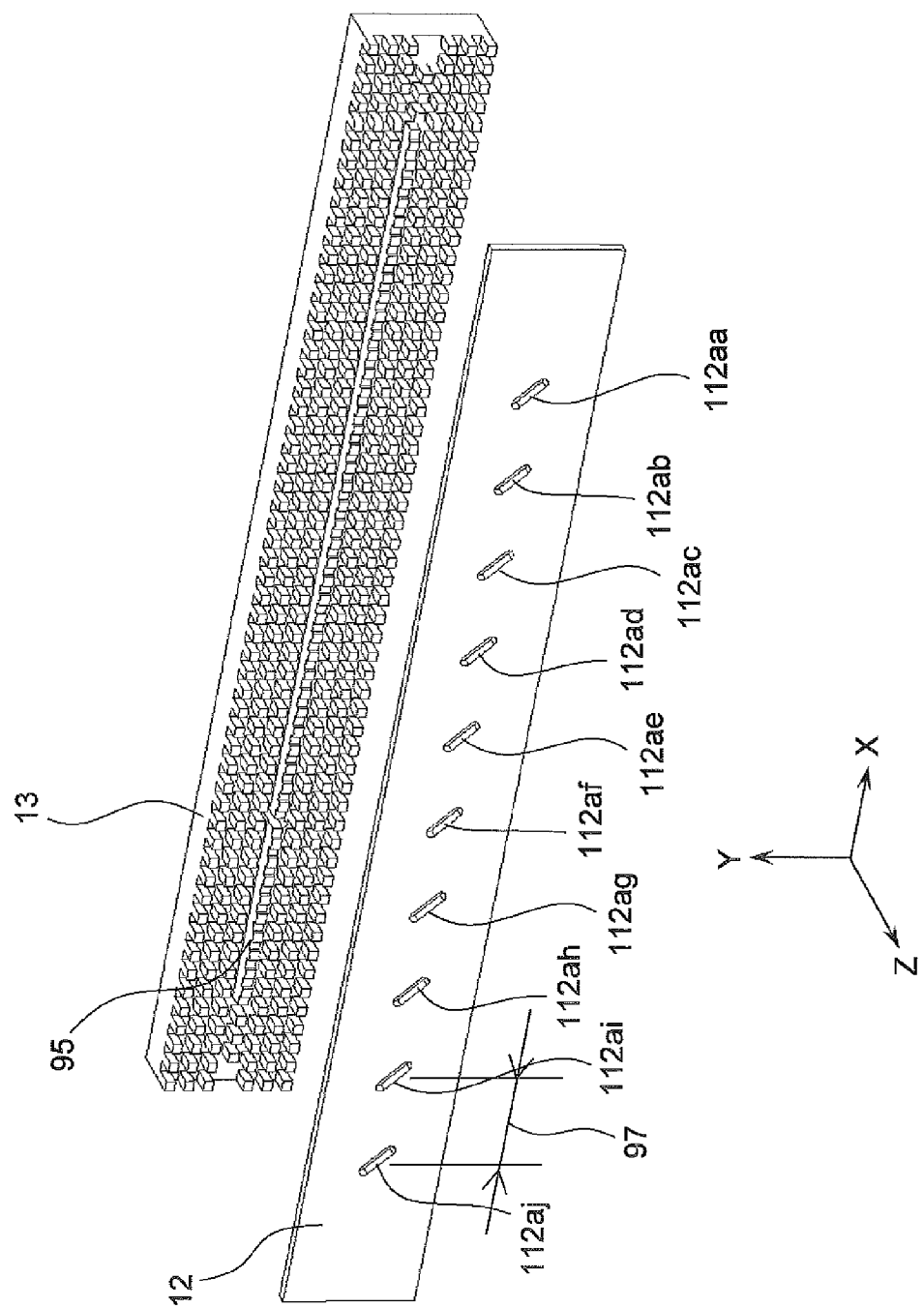
FIG. 25 is an oblique view of a radiator that makes use of a high-frequency waveguide in which the ridge height is variable periodically.
Figure 26:
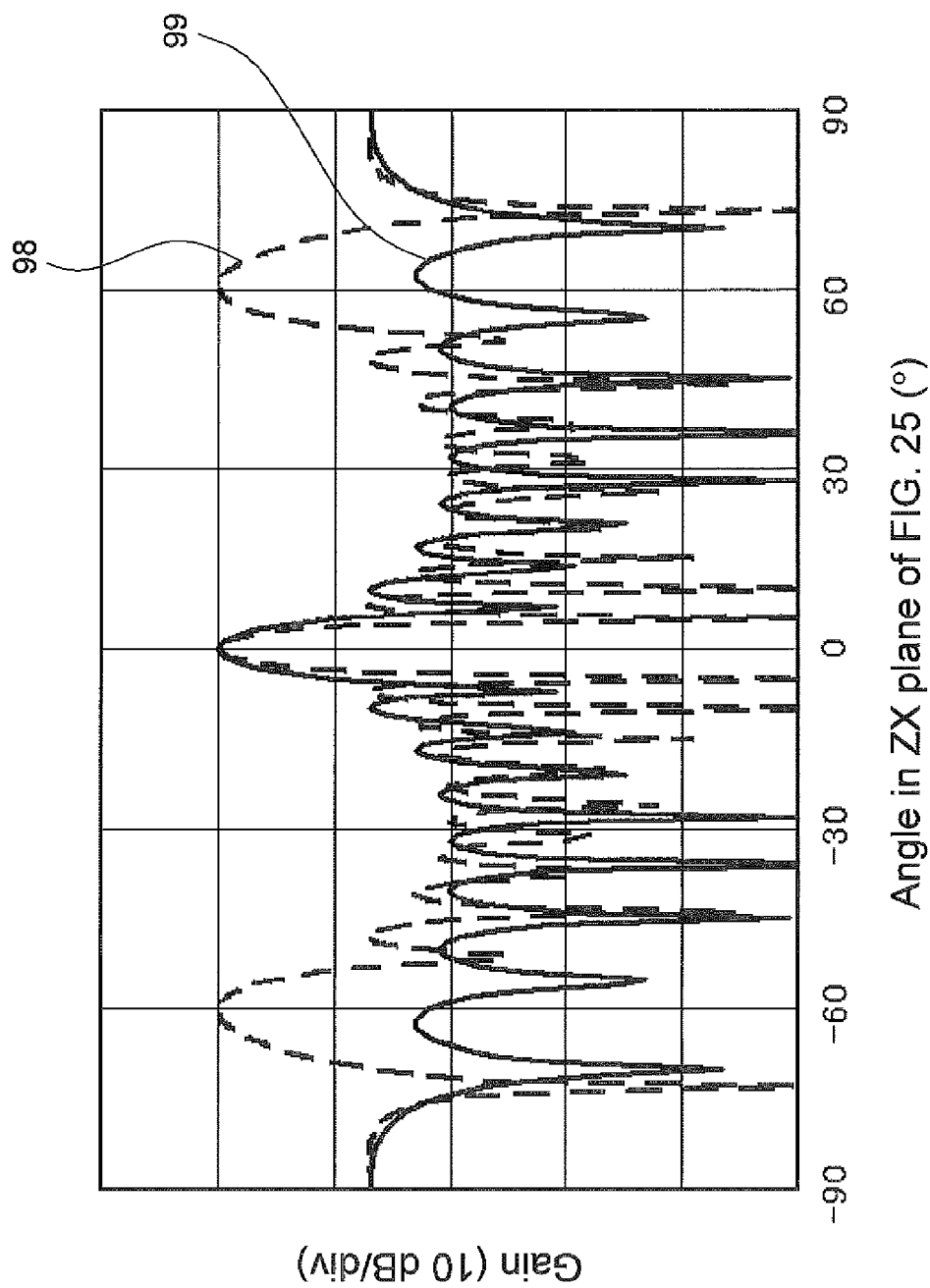
FIG. 26 is a directionality graph when the distance between radiation elements is varied.

FIG. 23 is an oblique view of a high-frequency waveguide in which the height of a ridge 95 is varied periodically. FIG. 24 is a wavelength graph for a high-frequency waveguide in which the height of the ridge is varied periodically. FIG. 25 is an oblique view of a radiator that makes use of a high-frequency waveguide in which the height of the ridge is varied periodically. FIG. 26 is a directionality graph when the distance between the radiation elements is changed.

The high-frequency waveguide shown in FIG. 23 has the same structure and shape as the high-frequency waveguide shown in FIG. 5, except for the ridge 95, whose height varies in the lengthwise direction. In FIG. 23, the upper conductor is not shown for the sake of simplifying the description, but the high-frequency waveguide is constituted by two conductors, namely, the upper conductor 23 and the lower conductor 22, just as in FIG. 5.

The high-frequency waveguide shown in FIG. 23 is provided with notches (recesses) 96 in the ridge 95 at a period of less than $\lambda_R/4$, where $\lambda_R$ is the wavelength on the high-frequency waveguide shown in FIG. 5 at the operating frequency. This allows the height of the ridge 95 in its lengthwise direction to be varied periodically.

FIG. 24 is a graph of the relation between the depth of the notches 96 and the wavelength on the high-frequency waveguide.

That is, as shown in FIG. 24, if we let $\lambda_0$ be the free space wavelength of the operating frequency, when the notches 96 are provided to vary the height at a period of less than $\lambda_R/4$ in the lengthwise direction of the ridge 95 and at a depth of from 0 to $\lambda_0/8$, the ratio $\lambda_g/\lambda_0$ of the wavelength $\lambda_g$ on the high-frequency waveguide to the free space wavelength $\lambda_0$ can be varied over a range of approximately 1.15 to 0.85.

The principle behind the ability to vary the wavelength on the high-frequency waveguide is that since the notches 96 act as a distal end short-circuit line in which the bottom faces of the notches serve as the short-circuit distal ends and the two opposing side faces on the inside of the notches serve as the transmission path for high-frequency energy propagated over the high-frequency waveguide, an equivalent impedance of the distal end short-circuit line corresponding to the depth of the notches 96 is inserted in series to the high-frequency waveguide as a distributed constant component.

FIG. 25 shows a radiator that makes use of a high-frequency waveguide in which the height is varied at a period of less than $\lambda_R/4$ in the lengthwise direction of the ridge 95. This corresponds to removing one high-frequency waveguide on the plate body 13 in FIG. 18 and one radiation element row on the plate body 12 in FIG. 19.

In FIG. 25, the high-frequency waveguide constituted by the ridge 95 is open at both ends. The length thereof is an integer multiple of the wavelength $\lambda_g$ on the high-frequency waveguide. Thus, the high-frequency waveguide is in a resonant state, and resonance current flows over the ridge 95.

Radiation element rows 112aa to 112aj are disposed at opposing positions (on the plate body 12) at places where the resonance current on the ridge 95 is at its maximum and where the resonance current has the same orientation. Thus, high-frequency energy of the same phase and amplitude is radiated into space from all of the radiation element rows 112aa to 112aj. As a result, the radiator in FIG. 25 operates as an array antenna having its main beam in the forward direction.

FIG. 25 shows a case in which $10\lambda_g$ is the length of the high-frequency waveguide and there are ten radiation element rows, but an array antenna having its main beam in the forward direction can be similarly obtained as long as K is equal to or greater than the number of radiation elements, wherein $K \cdot \lambda_g$ is the length of the high-frequency waveguide.

That is, when a radiator featuring a high-frequency waveguide that resonates with both ends open as shown in FIG. 25, the spacing 97 between the mutually adjacent radiation element rows 112aa to 112aj is matched to the wavelength on the high-frequency waveguide.

Also, FIG. 26 shows the directionality characteristics in the ZX plane of the radiator in FIG. 25. 98 is the directionality characteristics when the distance 97 between radiation elements is $1.15\lambda_0$, and 99 is the directionality characteristics when the distance 97 between radiation elements is $0.85\lambda_0$.

When an array antenna in which the radiation element rows 112aa to 112aj are excited at the same amplitude and phase, the main beam is in the forward direction, that is, in a direction with an angle of 0°. On the other hand, when the distance between the radiation element rows 112aa to 112aj is greater than the free space wavelength $\lambda_0$, the direction in which the high-frequency energy radiated into space from the radiation element rows 112aa to 112aj is within an angle of ±90°, generating a so-called grating lobe that scatters radio waves in unnecessary directions.

That is, the directionality characteristics in FIG. 26 generate a corresponding grating lobe having gain on the same level as the main beam in a direction with an angle of ±60°.

With an onboard radar, however, if a grating lobe is generated, the reflected wave from that angular direction ends up being received strongly, and the recognition accuracy suffers.

In contrast, if the distance between the radiation element rows 112aa to 112aj is made shorter than the free space wavelength $\lambda_0$, generation of a grating lobe will be suppressed to the same level as the main beam. Thus, degradation of recognition accuracy with an onboard radar can be prevented.

When the directionality characteristics 99 in FIG. 26 corresponding to this, and the distance between the radiation element rows 112aa to 112aj is set to $0.85\lambda_0$, generation of a grating lobe can be suppressed to the same level as the main beam.

That is, with the antenna apparatus pertaining to this embodiment, if we let $\lambda_R$ be the wavelength on the high-frequency waveguide when no notches 96 are provided at the operating frequency, the wavelength on the high-frequency waveguide is varied by varying the height at a period of less than $\lambda_R/4$ in the lengthwise direction of the ridge 95. A radiator with suppressed generation of a grating lobe at the same level as the main beam, which would degrade recognition accuracy, can be realized for an onboard radar by using a high-frequency waveguide in which the wavelength is further varied for the feeder line of the radiator.

Furthermore, with this embodiment, the amount of change in the phase of high-frequency energy passing through a high-frequency waveguide with a unit length can be varied by varying the wavelength on the high-frequency waveguide. Consequently, an effect is that using this as a phase adjustment line affords greater latitude in the layout of the antenna feeder line. It should go without saying that this effect is the scope encompassed by the present invention.

(B)

In the above embodiment, a radar for monitoring automobiles ahead was used as an example of an electronic device featuring the high-frequency waveguide pertaining to the present invention. As another embodiment, this radar may be used in heavy machinery and the like used at construction sites and so forth.

In recent years, in the field of automobiles, so-called hybrid vehicles, which combine a conventional engine with an electric motor, have debuted on the market as a way to conserve our natural resources. In the field of heavy machinery, just as in the automotive industry, there have been studies into hybrids that incorporate an electric motor. With a piece of hybrid heavy machinery such as this, just as with an automobile, engine output can be reduced by taking advantage of the high initial torque provided by an electric motor. Thus, energy conservation is a benefit. Furthermore, there is a dramatic drop in noise, so this is also effective as a noise abatement measure.

Nevertheless, although quieter operation of the heavy machinery is a way to achieve noise abatement, the downside is that a person approaching the machinery is not given a warning by the sound it makes. Therefore, there is a need to improve safety in the vicinity of the heavy machinery.

In this situation, it is favorable to use an electronic device featuring the high-frequency waveguide of the present invention in the heavy machinery itself as a radar for monitoring the surroundings. If this is done, then when a person is near the machinery, for example, the machinery operator will be alerted to exercise caution, and can halt the operation of the machinery. This makes it possible to improve the safety of heavy machinery that makes less noise.

(C)

In the above embodiment, the dimension in the height direction of the ridge 95 was used as an example of varying the ridge 95 in its lengthwise direction to form a high-frequency waveguide, but the present invention is not limited to this.

For instance, as shown in the side cross section of FIG. 28*a*, a high-frequency waveguide may be formed by using a ridge 195 having two different heights $Z_1$ and $Z_2$.

Alternatively, as shown in the plan view of FIG. 28*b*, a high-frequency waveguide may be formed by using a lower conductor (plate body 213) that includes a ridge 295 whose width varies in the lengthwise direction, and in which the spacing between adjacent columnar protrusions (protrusions for preventing the leakage of electromagnetic waves) is less than $\lambda_0/2$.

INDUSTRIAL APPLICABILITY

As discussed above, the present invention allows a reduction in size and a simplification of the configuration of an antenna, without moving the antenna itself, and is therefore expected to be very useful in its application to automobiles and so forth where there is a need for smaller size and lighter weight for the purpose of conserving energy.

REFERENCE SIGNS LIST

1 automobile body
2 tire
3 hood
4 interior
5 bumper
6 antenna apparatus
7 antenna body
8 waveguide body
9 transceiver
10 cover (permeable to radio waves)
11 case
12 plate body
12*a*, 12*b*, 12*c*, 12*d* radiation element group
12*aa* to 12*ad*, 12*ba* to 12*bd*, 12*ca* to 12*cd*, 12*da* to 12*dd* radiation element rows
13 plate body
14 plate body
15 plate body
16 plate body
17 plate body
18 substrate base
19 controller
20 RF circuit board
21 light receiving and emitting element
22, 22*a*, 22*b* lower conductor (first conductor, second conductor)
23, 23*a*, 23*b* upper conductor (second conductor, first conductor)
24 columnar protrusion (protrusion for preventing leakage of electromagnetic waves)
25 ridge
26 face linking distal ends of columnar protrusions
27*a*, 27*b*, 31, 33, 34, 36, 37, 38, 39, 40, 41, 42, 45, 46, 48, 50, 51, 53, 54, 55, 56, 57, 58, 59, 62, 63, 64, 65, 68, 69, 70, 71, 74, 75, 76, 77 through-hole
27*aa*, 27*ab* through-hole (linking path)
27*ba*, 27*bb* through-hole
28, 29 choke structure
30 sliding direction of intermediate conductor
32 ridge
32*a* ridge end
32*x* input terminal
35, 44, 47, 49, 52, 60, 61, 66, 67, 72, 73, 78, 79 ridge
60*a*, 61*a*, 66*a*, 67*a*, 72*a*, 73*a* position on ridge
80 disk-shaped plate body
81 position detection plate
82 clamping plate
83 screw
84 motor
85 hole
87 high-frequency waveguide
88 high-frequency waveguide
89 high-frequency waveguide
90 high-frequency waveguide
91, 92 (fixed) phase shifter
93, 94 (variable) phase shifter 95 ridge whose height is periodically varied
96 notch
97 distance between radiation elements
98 directionality characteristics when distance between radiation elements is $1.15\lambda_0$
99 directionality characteristics when distance between radiation elements is $0.85\lambda_0$
112aa to 112aj radiation element rows
195 ridge
213 plate body
224 columnar protrusion (protrusion for preventing leakage of electromagnetic waves)
295 ridge

The invention claimed is:

1. A phase shifter, comprising:
a high-frequency waveguide including
   first and second conductors disposed facing each other at a spacing of less than $\lambda_0/2$ when the free space wavelength of the operating frequency of a high-frequency signal is $\lambda_0$,
   a ridge that protrudes from one of the first and second conductors toward the other in a waveguide formation portion formed between the first and second conductors, and that is formed extending along the waveguide formation portion,
   a plurality of columnar protrusions with a height of $\lambda_0/4$ and disposed at a spacing of less than $\lambda_0/2$ on at least one of the first and second conductors on the outside of the waveguide formation portion and to the outside of the ridge, and
   a movement mechanism configured to relatively move the first and second conductors so as to vary a length of the waveguide,
wherein the first and second conductors include two first conductors and two second conductors,
wherein an intermediate conductor is constituted by bringing together two of the faces of the two first conductors,
wherein the two second conductors are disposed on the front and rear face sides of the intermediate conductor, respectively,
wherein a linking path goes through the two first conductors constituting the intermediate conductor, and
wherein the intermediate conductor is able to move relatively with respect to the two second conductors disposed on the front and rear face sides of the immediate conductor, respectively.

2. The phase shifter according to claim 1,
wherein the ridge is divided into a plurality of segments.

3. The phase shifter according to claim 1,
wherein the ridge varies in height in its lengthwise direction.

4. The phase shiftera ccording to claim 1,
wherein the ridge varies in its size in the width direction perpendicular to the height direction in its lengthwise direction.

5. The phase shifter according to claim 1,
wherein the high-frequency waveguide further includes:
   a linking path provided to the end of the ridge in a high-frequency signal transmission direction; and
   a waveguide whose opened distal end is provided on the opposite side of the end of the ridge in the linking path and is imparted with a choke function with a length of $\lambda_R/4$, and
wherein $\lambda_R$ is a wavelength of a high-frequency energy transmitted in the waveguide formation portion.

6. The phase shifter according to claim 1,
wherein, when the wavelength on the high-frequency waveguide at the operating frequency of a high-frequency signal is $\lambda_R$, the height of the ridge is varied at a period of less than $\lambda_R/4$ in the lengthwise direction of the ridge.

7. A radiator in which the phase shifter of claim 6 is used as a feed line.

8. An electronic device,
wherein the phase shifter according to claim 1 is disposed along a high-frequency transmission path thereof.

9. An electronic device, comprising:
an antenna body;
a waveguide body provided on the rear face side of the antenna body; and
a transceiver linked to the waveguide body,
wherein the waveguide body has the phase shifter according to claim 1.

10. The electronic device according to claim 9, further comprising a radiator in which the high-frequency waveguide is used as a feed line,
wherein the antenna body is linked to the radiator.

* * * * *